United States Patent
Ryoo et al.

(10) Patent No.: US 11,564,175 B2
(45) Date of Patent: Jan. 24, 2023

(54) METHOD AND APPARATUS FOR CONTROLLING UPLINK POWER IN WIRELESS COMMUNICATION SYSTEM

(71) Applicant: Samsung Electronics Co., Ltd., Suwon-si (KR)

(72) Inventors: Sun-Heui Ryoo, Yongin-si (KR); Jung-Soo Jung, Seongnam-si (KR); Hyun-Jeong Kang, Seoul (KR); Jong-Hyung Kwun, Seoul (KR); Sung-Jin Lee, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 67 days.

(21) Appl. No.: 17/092,795

(22) Filed: Nov. 9, 2020

(65) Prior Publication Data

US 2021/0058872 A1    Feb. 25, 2021

Related U.S. Application Data

(63) Continuation of application No. 16/670,335, filed on Oct. 31, 2019, now Pat. No. 10,834,682, which is a (Continued)

(30) Foreign Application Priority Data

May 2, 2013 (KR) ................ 10-2013-0049455
May 2, 2014 (KR) ................ 10-2014-0053393

(51) Int. Cl.
*H04B 7/00* (2006.01)
*H04W 52/14* (2009.01)
(Continued)

(52) U.S. Cl.
CPC ........ *H04W 52/146* (2013.01); *H04W 52/34* (2013.01); *H04W 52/365* (2013.01); *H04W 76/15* (2018.02); *H04W 76/27* (2018.02)

(58) Field of Classification Search
CPC . H04W 52/146; H04W 52/34; H04W 52/365; H04W 76/15; H04W 76/27
(Continued)

(56) References Cited

U.S. PATENT DOCUMENTS 7,706,804 B2    4/2010    Huh et al.
7,778,217 B2    8/2010    Lee et al.
(Continued)

FOREIGN PATENT DOCUMENTS

CN    102932892 A    2/2013
CN    102934499 A    2/2013
(Continued)

OTHER PUBLICATIONS

Chinese Office Action dated Dec. 28, 2021, issued in Chinese Application No. 201910920036.4.
(Continued)

*Primary Examiner* — Marceau Milord
(74) *Attorney, Agent, or Firm* — Jefferson IP Law, LLP

(57) ABSTRACT

A method and an apparatus for controlling uplink power in a wireless communication system are provided. The method for controlling uplink power of a User Equipment (UE) forming a transmission link with a plurality of BSs (BSs), a power headroom report trigger event by at least one of the plurality of BSs is detected. Power headroom information of the UE is reported to at least one of the plurality of BSs.

16 Claims, 19 Drawing Sheets

Related U.S. Application Data continuation of application No. 16/144,273, filed on Sep. 27, 2018, now Pat. No. 10,531,396, which is a continuation of application No. 15/439,421, filed on Feb. 22, 2017, now Pat. No. 10,142,940, which is a continuation of application No. 14/268,783, filed on May 2, 2014, now Pat. No. 9,603,098.

(51) Int. Cl.
  *H04W 76/27* (2018.01)
  *H04W 76/15* (2018.01)
  *H04W 52/34* (2009.01)
  *H04W 52/36* (2009.01)

(58) Field of Classification Search
  USPC .......................................................... 455/522
  See application file for complete search history.

(56) References Cited

U.S. PATENT DOCUMENTS

| | | | |
|---|---|---|---|
| 8,224,345 B2 | 7/2012 | Englund et al. | |
| 8,249,091 B2 | 8/2012 | Kim et al. | |
| 8,274,952 B2* | 9/2012 | Jard | H04W 52/143 |
| | | | 370/335 |
| 8,295,236 B2 | 10/2012 | Ishii et al. | |
| 8,315,320 B2 | 11/2012 | Zhang et al. | |
| 8,442,001 B2 | 5/2013 | Gaal et al. | |
| 8,537,767 B2 | 9/2013 | Zhang et al. | |
| 8,565,205 B2 | 10/2013 | Ho et al. | |
| 8,576,783 B2 | 11/2013 | Huh et al. | |
| 8,655,400 B2 | 2/2014 | Kadous et al. | |
| 8,687,541 B2 | 4/2014 | Lohr et al. | |
| 8,724,492 B2 | 5/2014 | Frank et al. | |
| 8,774,819 B2 | 7/2014 | Zhang et al. | |
| 8,797,966 B2 | 8/2014 | Dinan | |
| 8,798,654 B2 | 8/2014 | Rossel et al. | |
| 8,818,441 B2 | 8/2014 | Haim et al. | |
| 8,873,475 B2 | 10/2014 | Ono | |
| 8,891,436 B2 | 11/2014 | Zhang et al. | |
| 8,953,551 B2 | 2/2015 | Inoue et al. | |
| 8,958,836 B2 | 2/2015 | Chen | |
| 8,964,664 B2 | 2/2015 | Hu et al. | |
| 9,001,777 B2* | 4/2015 | Zhang | H04L 5/0094 |
| | | | 370/464 |
| 9,008,000 B2 | 4/2015 | Kim et al. | |
| 9,019,836 B2 | 4/2015 | Klingenbrunn et al. | |
| 9,020,556 B2 | 4/2015 | Haim et al. | |
| 9,025,478 B2 | 5/2015 | Jung et al. | |
| 9,049,724 B2 | 6/2015 | Dinan | |
| 9,078,264 B2 | 7/2015 | Han et al. | |
| 9,113,422 B2 | 8/2015 | Jeong et al. | |
| 9,258,725 B2 | 2/2016 | Jung et al. | |
| 9,392,553 B2 | 7/2016 | Haim et al. | |
| 9,393,553 B2 | 7/2016 | Kawaguchi et al. | |
| 9,603,098 B2* | 3/2017 | Ryoo | H04W 52/34 |
| 9,713,104 B2 | 7/2017 | Zhao et al. | |
| 9,826,489 B2 | 11/2017 | Park et al. | |
| 9,876,554 B2 | 1/2018 | Kazmi et al. | |
| 10,142,940 B2* | 11/2018 | Ryoo | H04W 76/15 |
| 10,206,182 B2* | 2/2019 | Oketani | H04W 52/365 |
| 10,531,396 B2* | 1/2020 | Ryoo | H04W 76/27 |
| 10,834,682 B2* | 11/2020 | Ryoo | H04W 52/146 |
| 10,869,283 B2* | 12/2020 | Sivanesan | H04W 52/365 |
| 2007/0115871 A1 | 5/2007 | Zhang et al. | |
| 2009/0318180 A1* | 12/2009 | Yi | H04W 52/365 |
| | | | 455/522 |
| 2010/0085884 A1 | 4/2010 | Srinivasan et al. | |
| 2010/0158147 A1 | 6/2010 | Zhang et al. | |
| 2010/0232382 A1 | 9/2010 | Gauvreau et al. | |
| 2010/0296470 A1* | 11/2010 | Heo | H04L 5/0053 |
| | | | 370/329 |
| 2011/0105173 A1* | 5/2011 | Haim | H04W 52/34 |
| | | | 455/522 |
| 2011/0159912 A1 | 6/2011 | Zong | |
| 2011/0243016 A1* | 10/2011 | Zhang | H04W 72/04 |
| | | | 370/252 |
| 2012/0044882 A1 | 2/2012 | Kim et al. | |
| 2012/0113845 A1 | 5/2012 | Kim et al. | |
| 2012/0114457 A1* | 5/2012 | Nicoletti | B65D 25/108 |
| | | | 206/562 |
| 2012/0147801 A1 | 6/2012 | Ho et al. | |
| 2012/0178494 A1* | 7/2012 | Haim | H04W 72/082 |
| | | | 455/522 |
| 2012/0184221 A1 | 7/2012 | Jung et al. | |
| 2012/0207112 A1 | 8/2012 | Kim et al. | |
| 2012/0218904 A1 | 8/2012 | Narasimha et al. | |
| 2012/0314640 A1 | 12/2012 | Kim et al. | |
| 2013/0010720 A1 | 1/2013 | Lohr et al. | |
| 2013/0028231 A1* | 1/2013 | Zhang | H04W 72/0453 |
| | | | 370/329 |
| 2013/0039314 A1 | 2/2013 | Prateek et al. | |
| 2013/0070716 A1 | 3/2013 | Kwon et al. | |
| 2013/0114457 A1 | 5/2013 | Han et al. | |
| 2013/0324182 A1 | 12/2013 | Deng et al. | |
| 2014/0023010 A1 | 1/2014 | Loehr et al. | |
| 2014/0056278 A1 | 2/2014 | Marinier et al. | |
| 2014/0092877 A1* | 4/2014 | Kazmi | H04B 7/0413 |
| | | | 370/336 |
| 2014/0241301 A1 | 8/2014 | Nakashima et al. | |
| 2015/0078264 A1* | 3/2015 | Han | H04N 7/147 |
| | | | 370/329 |
| 2015/0181479 A1 | 6/2015 | Lin et al. | |
| 2015/0192796 A1* | 7/2015 | Moriya | G02B 27/646 |
| | | | 359/557 |
| 2015/0215877 A1* | 7/2015 | Ahn | H04W 52/365 |
| | | | 455/522 |
| 2015/0304966 A1 | 10/2015 | Park et al. | |
| 2015/0351119 A1 | 12/2015 | Song et al. | |
| 2016/0057712 A1 | 2/2016 | Wen et al. | |
| 2016/0278026 A1 | 9/2016 | Haim et al. | |

FOREIGN PATENT DOCUMENTS

| | | |
|---|---|---|
| CN | 103069870 A | 4/2013 |
| CN | 104105192 A | 10/2014 |
| EP | 2 575 390 A1 | 4/2013 |
| JP | 2013-509759 A | 3/2013 |
| JP | 2013509759 A | 3/2013 |
| KR | 10-2011-0082157 A | 7/2011 |
| KR | 10-2013-0001286 A | 1/2013 |
| KR | 10-2013-0019363 A | 2/2013 |
| KR | 10-2013-0024906 A | 3/2013 |
| KR | 10-2013-0027086 A | 3/2013 |
| KR | 10-2013-0031883 A | 3/2013 |
| WO | 2013/025562 A2 | 2/2013 |
| WO | 2013/046965 A1 | 4/2013 |

OTHER PUBLICATIONS

Korean Notice of Patent Grant dated Feb. 23, 2021, issued in Korean Application No. 10-2020-0160486.

Japanese Office Action dated Feb. 8, 2021, issued in Japanese Application No. 2019-16971.

Pantech: "Considerations on Scheduler Architecture for dual connectivity", 3GPP Draft; R2-131095, 3rd Generation Partnership Project (3GPP), Mobile Competence Centre; 650, Route Des Lucioles ; F-06921 Sophia-Antipolis Cedex; France • vol. RAN WG2, No. Chicago, USA; Apr. 15, 2013-Apr. 19, 2013; Apr. 5, 2013 (Apr. 5, 2013), XP050699252.

"3rd Generation Partnership Project; Technical Specification Group Radio Access Network; Evolved Universal Terrestrial Radio Access (E-UTRA); Medium Access Control (MAC) protocol specification (Release 11)", 3GPP Draft; 36321-B20, 3rd Generation Partnership Project (3GPP), Mobile Competence Centre 350, Route Des Lucioles ; F-06921 Sophia-Antipolis Cedex; France;Mar. 13, 2013 (Mar. 13, 2013), XP050698880.

"3rd Generation Partnership Project; Technical Specification Group Radio Access Network; Evolved Universal Terrestrial Radio Access

(56) References Cited

OTHER PUBLICATIONS (E-UTRA); Radio Resource Control (RRC); Protocol specification (Release 10)", 3GPP Draft; 36331-A90, 3rd Generation Partnership Project (3GPP), Mobile Competence Centre 650, Route Des Lucioles ; F-06921 Sophia-Antipolis Cedex; France; Mar. 21, 2013 (Mar. 21, 2013), XP050698908.
"3rd Generation Partnership Project;Technical Specification Group Radio Access Network; Evolved Universal Terrestrial Radio Access (E-UTRA); Physical layer procedures (Release 11)", 3GPP Standard; 3GPP TS 36.213, 3rd Generation Partnership Project (3GPP), Mobile Competence Centre; 650, Route Des Lucioles ; F-06921 Sophia-Antipolis Cedex; France, vol. RAN WGI, No. VII.2.0; Mar. 15, 2013 (Mar.15, 2013), pp. 1-173, XP050692225.
Japanese Office Action dated Jan. 15, 2018 issued in Japanese Patent Application No. JP2016-511686.
Chinese Office Action dated May 4, 2018, issued in Chinese Patent Application No. 201480038396.7.
European Office Action dated Aug. 9, 2018, issued in the European Application No. 14 791 593.8-1219.
Japanese Office Action dated Sep. 21, 2018, issued in the Japanese Application No. JP2016-511686.
Chinese Office Action dated Jan. 14, 2019; Application or Patent #: 201480038396.7; Issuing #: 2019010901615670.
European Office Action dated Dec. 20, 2018; Application #: 14 791 593.8-1219; Ref. SAK/P228850EP.
European Office Action dated May 28, 2019, issued in European Application No. 14 791 593.8-1219.
Japanese Notice of Patent Grant dated Apr. 22, 2019, issued in Japanese Application No. 2016-511686.
Indian Office Action dated Jul. 24, 2020, issued in Indian Application No. 3603/KOLNP/2015.
European Summons to Attend Oral Proceedings dated Sep. 22, 2020 issued in European Application No. 14791593.8.
Korean Notice of Allowance dated Aug. 25, 2020, issued in Korean Application No. 10-2014-0053393.
European Office Action dated May 7, 2020, issued in European Application No. 14791593.8.
Japanese Office Action dated May 25, 2020, issued in Japanese Application No. JP2019-016971.
Pantech, "Considerations on Scheduler Architecture for dual connectivity," 3GPP TSG RAN WG2 Meeting #81bis R2-131095, Chicago, USA, Apr. 15-19, 2013.
"3rd Generation Partnership Project; Technical Specification Group Radio Access Network; Evolved Universal Terrestrial Radio Access (E-UTRA); Medium Access Control (MAC) protocol specification (Release 11)", 3GPP Draft; 36321-B20, 3rd Generation Partnership Project (3GPP), Mobile Competence Centre 650, Route Des Lucioles, F-06921 Sophia-Antipolis Cedex; France Mar. 13, 2013 (Mar. 13, 2013), XP050698880.
"3rd Generation Partnership Project; Technical Specification Group Radio Access Network; Evolved Universal Terrestrial Radio Access (E-UTRA); Radio Resource Control (RRC); Protocol specification (Release 10)", 3GPP Draft; 36331-A98, 3rd Generation Partnership Project (3GPP), Mobile Competence Centre; 658, Route Des Lucioles, F-86921 Sophia-Antipolis Cedex; France Mar. 21, 2013 (Mar. 21, 2013), XP050698908.
"3rd Generation Partnership Project; Group Radio Access Network; Evolved Universal Terrestrial Radio Access (E-UTRA); Physical layer procedures (Release 11)", 3GPP Standard; 3GPP TS 36.213, 3rd Generation Partnership Project (3GPP), Mobile Competence Centre, 650, Route Des Lucioles, F-06921 Sophia-Antipolis Cedex; France, vol. RAN WGI, No. V11.2.0, Mar. 15, 2013 (Mar. 15, 2013), pp. 1-173, XP050692225, sections 5.1.1.1 and 5.1.1.2..
European Search Report dated Aug. 25, 2021, issued in European Application No. 21182534.4.
Notice of Allowance dated Sep. 27, 2021, issued in Japanese Application No. 2019-16971.
Indian Office Action dated Oct. 4, 2022, issued in Indian Application No. 3603/KOLNP/2015.

* cited by examiner

METHOD AND APPARATUS FOR CONTROLLING UPLINK POWER IN WIRELESS COMMUNICATION SYSTEM

CROSS-REFERENCE TO RELATED APPLICATION(S)

This application is a continuation application of prior application Ser. No. 16/670,335 filed on Oct. 31, 2019, which has issued as U.S. Pat. No. 10,834,682 on Nov. 10, 2020 and is a continuation application of prior application Ser. No. 16/144,273 filed on Sep. 27, 2018, which has issued as U.S. Pat. No. 10,531,396 on Jan. 7, 2020 and is a continuation application of prior application Ser. No. 15/439,421, filed on Feb. 22, 2017, which has issued as U.S. Pat. No. 10,142,940 on Nov. 27, 2018, which is a continuation application of prior application Ser. No. 14/268,783, filed on May 2, 2014, which has issued as U.S. Pat. No. 9,603,098 on Mar. 21, 2017 and was based on and claimed priority under 35 U.S.C. § 119(a) of a Korean patent application number 10-2013-0049455, filed on May 2, 2013, in the Korean Intellectual Property Office and a Korean patent application number 10-2014-0053393, filed on May 2, 2014 in the Korean Intellectual Property Office, the entire disclosures of each of which are hereby incorporated by reference

TECHNICAL FIELD

The present disclosure relates to controlling uplink power in a wireless communication system. More particularly, the present disclosure relates to a method and an apparatus for reporting uplink power of a Mobile Station (MS).

BACKGROUND

A Base Station (BS) performs scheduling using power headroom information of an MS in order to efficiently utilize resources of the MS in a wireless communication system. That is, when the MS provides power headroom information to the BS, the BS may estimate maximum uplink transmission power supportable by the MS based on the power headroom information of the MS, and perform control uplink power using such items as Transmit Power Control (TPC), a Modulation and Coding Scheme (MCS) level, a bandwidth, etc. within a range that does not depart from the estimated uplink maximum transmission power.

A network structure that offloads explosively increasing data by additionally installing a small cell network to an existing wireless communication system, such as, a macro cellular network with consideration of a phenomenon that an amount of mobile traffic data increases rapidly is widely used.

For example, a structure that additionally installs a plurality of BSs having a small cell whose transmission region is small, such as a pico cell or a femto cell to a cell region of a macro BS is being provided. In this case, a User Equipment (UE) may wirelessly connect to the macro BS and a small BS simultaneously, and perform uplink transmission to a plurality of BSs that are being connected wirelessly. However, in the related art, only a power headroom report method for controlling uplink transmission power of a UE in the case where the UE is being connected to one BS is provided, and a power headroom report method for controlling uplink transmission power of a UE in the case where the UE is being connected to a plurality of BSs has not been provided. Also, in the case where a plurality of BSs perform wireless resource allocation, the wireless resource allocation is correlated complexly by the medium of the UE, so that complexity for optimizing wireless resource allocation is increased. Furthermore, optimization via real-time information sharing between BSs is required. However, when a circuit (X2) between BSs is actually implemented, a delay time is generated, so that performance deteriorates.

Therefore, an uplink power headroom report method of a UE connected to a plurality of BSs needs to be provided.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a power headroom report method of a User Equipment (UE) and an apparatus thereof in a wireless communication system where one UE supports a transmission link for a plurality of Base Stations (BSs) simultaneously.

Another aspect of the present disclosure is to provide a method and an apparatus for detecting a power headroom changed by uplink scheduling of a specific BS, and reporting the changed power headroom to at least one of the specific BS and another BS in a wireless communication system where a UE supports a transmission link for a plurality of BSs simultaneously.

Still another aspect of the present disclosure is to provide a method and an apparatus for detecting a power headroom report trigger event by at least one BS, and reporting the detected power headroom to at least one BS from which the power headroom report trigger event has been detected and/or another BS in a wireless communication system where a UE supports a transmission link for a plurality of BSs simultaneously.

Yet another aspect of the present disclosure is to provide a method and an apparatus for distributing uplink maximum transmission power of a UE to a plurality of BSs that are being connected in a wireless communication system where the UE supports a transmission link for the plurality of BSs simultaneously.

Yet still another aspect of the present disclosure is to provide a method and an apparatus for distributing uplink maximum transmission power based on Aggregated Maximum Bit Rate (AMBR), a path loss, a bandwidth, and a weight factor for each of a plurality of BSs that are being connected in a wireless communication system where a UE supports a transmission link for the plurality of BSs simultaneously.

Yet further another aspect of the present disclosure is to provide a method and an apparatus for adjusting uplink transmission power distributed to each BS to which a UE is being connected based on a data amount of an uplink buffer for a relevant BS in a wireless communication system where the UE supports a transmission link for a plurality of BSs simultaneously.

Still further another aspect of the present disclosure is to provide a method and an apparatus for transmitting, at a BS, information required for controlling a power headroom report of a UE using a Radio Resource Control (RRC)

message in a wireless communication system where the UE supports a transmission link for a plurality of BSs simultaneously.

In accordance with an aspect of the present disclosure, a method for controlling uplink power of a UE forming a transmission link with a plurality of BSs in a wireless communication system is provided. The method includes detecting a power headroom report trigger event by at least one of the plurality of BSs, and reporting power headroom information of the UE to at least one of the plurality of BSs.

In accordance with another aspect of the present disclosure, a method of a BS, for controlling uplink power of a UE forming a transmission link with a plurality of BSs in a wireless communication system is provided. The method includes forming a transmission link with the UE, and receiving a message reporting power headroom information from the UE, wherein the message reporting the power headroom information may be received by a power headroom report trigger by at least one of the plurality of BSs.

In accordance with still another aspect of the present disclosure, an apparatus for controlling uplink power of a UE forming a transmission link with a plurality of BSs in a wireless communication system is provided. The apparatus includes a transceiver configured to form the transmission link with the plurality of BSs to transmit/receive a signal, and a power headroom report controller configured to detect a power headroom report trigger event by at least one of the plurality of BSs, and control to report power headroom information of the UE to at least one of the plurality of BSs.

In accordance with yet another aspect of the present disclosure, an apparatus of a BS, for controlling uplink power of a UE forming a transmission link with a plurality of BSs in a wireless communication system is provided. The apparatus includes a transceiver configured to form a transmission link with the UE to transmit/receive a signal, and a scheduler configured to receive a message reporting power headroom information from the UE via the transceiver, wherein the message reporting the power headroom information may be received by a power headroom report trigger by at least one of the plurality of BSs.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
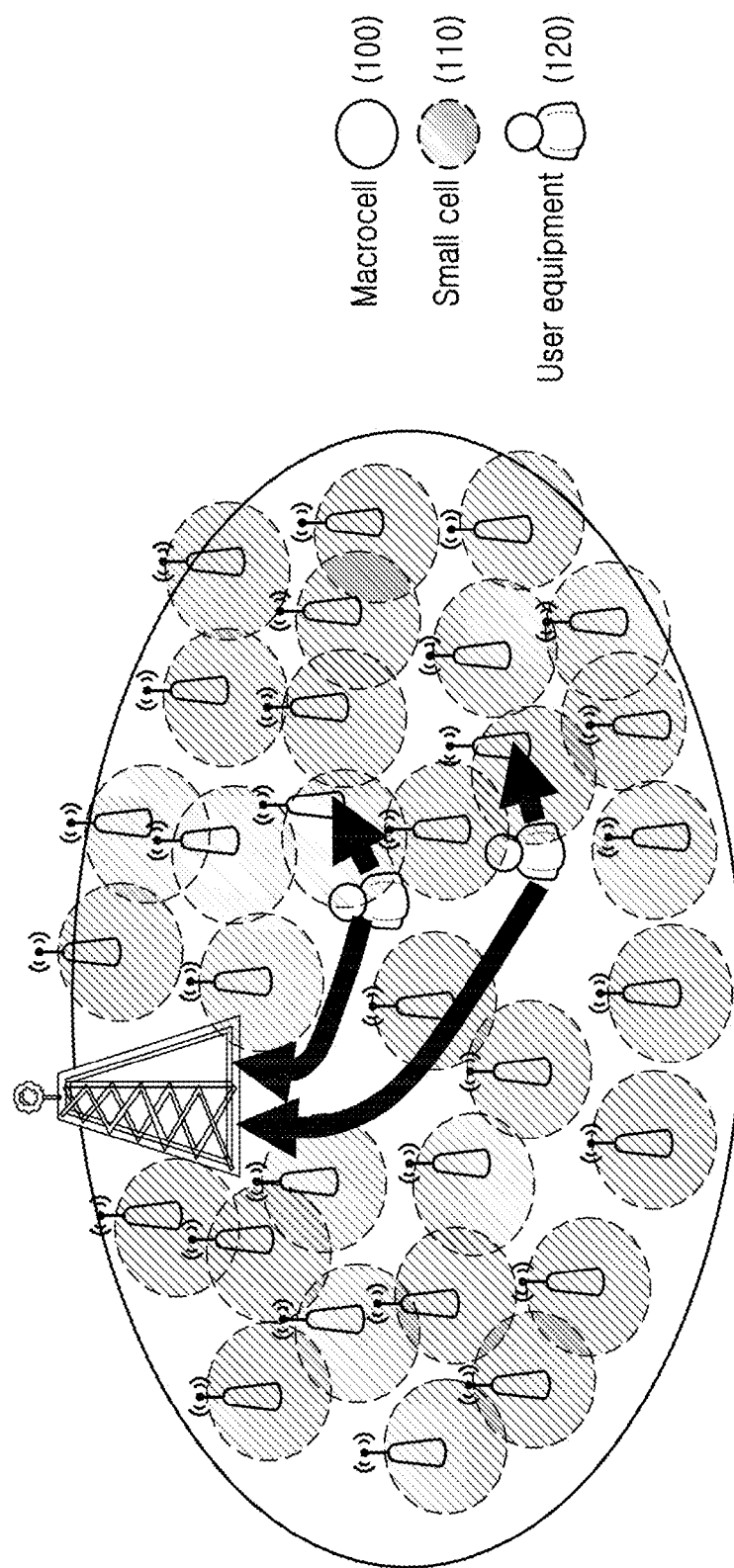
FIG. 1 is a view illustrating a wireless communication system where a macro cell and a small cell coexist according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Various embodiments of the present disclosure propose an alternative for efficiently using uplink transmission power in the case where one User Equipment (UE) uses a plurality of links for a plurality of Base Stations (BSs) simultaneously.

Hereinafter, the present specification describes a portion of embodiments with reference to various drawings. It is noted that like reference numerals are used for like elements even though they are illustrated in different drawings in adding reference numerals to elements of each drawing. Also, descriptions of well-known functions and constructions are omitted for clarity and conciseness.

Also, in describing elements of the present specification, terminologies such as a first, a second, A, B, (a), (b), etc. may be used. These terminologies are used only for the purpose of discriminating one element from another element, and the essence of a relevant element is not limited to a sequence or an order by those terminologies. In the case where a certain element is "connected", "coupled", or "joined" to another element, it should be understood that the element may be directly connected or joined to another element but still another element may be "connected", "coupled", or "joined" between those elements.

Also, the present specification describes a wireless communication network as an object, and an operation performed in a wireless communication network may be performed during a process of controlling a network and transmitting data in a system (for example, a BS) having control over a relevant wireless communication network, or an operation may be performed at a UE that has coupled to a relevant wireless network.

A wireless communication system according to an embodiment of the present disclosure includes a plurality of BSs. Each BS provides a communication service for a specific geographic area (generally called a cell). A cell may be divided into a plurality of regions (or sectors) again.

A Mobile Station (MS) may be fixed or have mobility, and may be called different terminologies such as a UE, a Mobile Terminal (MT), a User Terminal (UT), a Subscriber Station (SS), a wireless device, a Personal Digital Assistant (PDA), a wireless modem, a handheld device, etc.

A BS generally denotes a fixed station communicating with a mobile station, and may be called different terminologies such as evolved-Node B (eNB), a Base Transceiver System (BTS), an Access Point (AP), etc. A cell should be construed as having a comprehensive meaning representing a portion of a region covered by a BS, and having a meaning including any of a mega cell, a macro cell, a micro cell, a pico cell, a femto cell, etc.

Hereinafter, the term "downlink" denotes communication from a BS to a mobile station, and the term "uplink" denotes communication from a mobile station to a BS. In the downlink, a transmitter may be a portion of a BS, and a receiver may be a portion of a mobile station. In the uplink, a transmitter may be a portion of a mobile station, and a receiver may be a portion of a BS.

FIG. 1 is a view illustrating a wireless communication system where a macro cell and a small cell coexist according to an embodiment of the present disclosure.

Referring to FIG. 1, an embodiment of the present disclosure exemplarily describes a wireless communication system where a plurality of BSs having different cell sizes coexist. For example, the embodiment of the present disclosure exemplarily describes a wireless communication system where a macro cell 100 and a small cell 110 coexist. However, embodiments described below are equally applicable to a case where an MS supports wireless connection for a plurality of BSs simultaneously in a wireless communication system including a plurality of BSs having the same cell size.

Also, hereinafter, an embodiment of the present disclosure exemplarily describes a case where one UE 120 supports wireless connection for two BSs, that is, supports dual connectivity. For example, the embodiment exemplarily describes a case where the UE 120 forms wireless links for a BS (referred to as a 'macro BS', hereinafter) of one macro cell 100 and a BS (referred to as a 'small BS', hereinafter) of one small cell 110, simultaneously. However, the present disclosure is equally applicable to a case of forming a plurality of wireless links for a plurality of macro BSs, a case of forming a plurality of wireless links for a plurality of small BSs, a case of forming a plurality of wireless links for one macro BS and a plurality of small BSs, and a case of forming a plurality of wireless links for a plurality of macro BSs and one small BS. Here, the fact that the UE 120 supports wireless connection for a plurality of BSs or forms wireless links for a plurality of BSs may mean a state where the UE 120 may receive a service via a control channel and/or a data channel from each of the plurality of BSs.

Also, the following description assumes a circumstance where a macro BS among the macro BS and a small BS to which a UE is being connected operates as a master BS to control other small BSs inside the system, and a case where a UE receives control information related to a power headroom report from the master BS is exemplarily described. However, depending on a design scheme, the system may operate under independent control of the small BS, and in this case, the UE may receive control information related to power headroom report from the small BS.

Generally, maximum transmission power of an MS that uses a wireless communication technology is limited. The maximum use power of the MS that uses the wireless communication technology is limited by a government regulation, etc., and a maximum use power value may be differently set depending on regulations of each country. Therefore, the MS reports a Power Headroom (PH) amount to a serving BS via a control element of a Medium Access Control (MAC) layer in order to communicate with a macro BS and a small BS inside limited power, and a BS performs uplink scheduling based on a power headroom amount of the MS. Here, the power headroom amount means additionally available extra power besides power which the MS currently uses for uplink transmission. For example, assuming a circumstance where maximum transmission power of the MS is 200 mW and the MS currently uses power of 180 mW in a frequency band of 10 MHz, a power headroom of the MS becomes 20 mW.

In an embodiment of the present disclosure, since the MS forms a wireless link for a macro BS and a small BS, both the macro BS and the small BS require information regarding a power headroom amount of the MS. Therefore, an embodiment of the present disclosure describes a method for reporting a power headroom amount to the macro BS and the small BS to which the MS is being wirelessly connected.

Figure 2A:
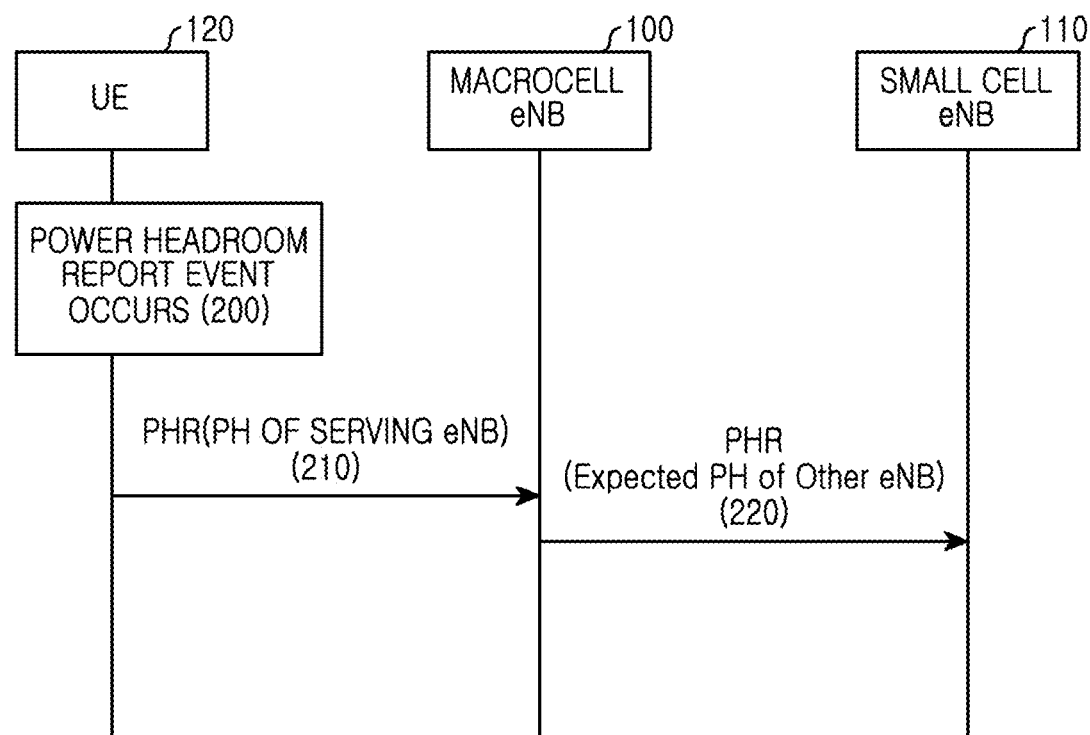
FIG. 2A is a view illustrating a procedure that exchanges power headroom information of a User Equipment (UE) between Base Stations (BSs) in a wireless communication system according to an embodiment of the present disclosure.

FIG. 2A is a view illustrating a procedure that transmits power headroom information of UE between BSs in a wireless communication system according to an embodiment of the present disclosure.

Referring to FIG. 2A, UE 120 detects occurrence of a Power Headroom Report (PHR) event in operation 200. For example, the UE 120 may detect at least one of a path loss change, a P-Maximum Power Reduction (MPR), S cell addition, and power back off by a MAC entity corresponding to at least one BS among two BSs connected via a wireless link to detect an event for triggering a power headroom report. Also, the UE 120 may detect whether an event for triggering a power headroom report occurs based on a periodic timer, a prohibit timer, a path loss value, etc. Here, the periodic timer means a time that controls a power headroom report to be periodically triggered, and the prohibit timer means a time that controls a power headroom report not to be triggered. In the case where an uplink resource for new transmission is allocated to a current Transmission Time Interval (TTI), or in the case where an allocated uplink resource may accept a PHR MAC control element including a sub header as a result of a logic channel priority, or in the case where a power headroom report is triggered, the periodic timer may start (or may be driven) or restart (or may be re-driven). Also, the periodic timer for triggering a power headroom report and the prohibit timer may start when each MAC entity transmits a relevant PHR. A value of the periodic timer and the prohibit timer may be expressed as the number of subframes. For example, in the case where a value of the periodic timer is 10, the UE may trigger a power headroom report every 10 subframes. In contrast, in the case where a value of the prohibit timer is 10, an MS may block a trigger of a power headroom report during 10 subframes. In this case, when 10 subframes elapse and the prohibit timer expires, an opportunity that may trigger a power headroom report may be obtained.

For example, it may occur that the UE 120 detects occurrence of a power headroom report event in operation 200. In the case where a periodic timer or a periodic PHR timer set in advance expires, the UE 120 may detect a power headroom report event. For another example, in the case where an estimated path loss value changes by a threshold or more with respect to a macro BS 100, the UE 120 may detect a power headroom report event. For still another example, the UE 120 may detect a power headroom report event based on at least one of a path loss change, an MPR, Scell activation, and power back off by a MAC entity corresponding to at least one BS among two BSs connected via a wireless link. Here, a threshold of a periodic timer, a prohibit timer, a path loss, etc. may be obtained by receiving a Radio Resource Control (RRC) message illustrated in Table 1 below from the macro BS 100. Also, a path loss value may be measured based on reception power of a reference symbol received from the macro BS 100. According to another embodiment, the threshold of the periodic timer, the prohibit timer, and the path loss may be obtained by receiving an RRC message illustrated in Table 1 below from a small BS 110, and the path loss value may be measured based on reception power of a reference symbol received from the small BS 110.

The UE 120 estimates a power headroom, and reports the estimated power headroom to the macro BS 100 in operation 210. In the present specification, a power headroom may mean a power headroom amount. A power headroom $P_{PH}$ may be defined as a difference value between maximum transmission power $P_{max}$ set in advance to the UE 120 and power $P_{estimated}$ estimated for uplink transmission, and may be expressed in terms of dB. Depending on an embodiment, the UE 120 may report a transmission power amount expressed in terms of dB, and quantize a transmission power amount using n bits and report the same. For example, a power headroom may be expressed within a range from −23 dB to +40 dB. In the case where 6 bits are used in representing a power headroom, 64 indexes ($2^6$=64) may be represented using 6 bits, so that the range from −23 dB to +40 dB may be divided into 64 steps. That is, in the case where a power headroom is equal to or greater than −23 dB and less than −22 dB, the UE 120 may report 000001, in the case where a power headroom is equal to or greater than −22 dB and less than −21 dB, the UE 120 may report 000010, in the case where a power headroom is equal to or greater than −21 dB and less than −20 dB, the UE 120 may report 000011, . . . , and in the case where a power headroom is equal to or greater than 40 dB, the UE 120 may report 111111. Here, each MAC entity may independently detect a periodic power headroom report trigger or a trigger of a power headroom report by reconfiguration to transmit the PHR to a relevant BS.

The macro BS 100 that has received a power headroom report from the UE 120 determines that the UE 120 is being connected to the small BS 110 simultaneously, and may exchange power headroom information of the UE 120 with the small BS 110 in operation 220. At this point, the macro BS 100 and the small BS 110 may exchange power headroom information via an X2 interface. The small BS 110 may obtain power headroom information of the UE 120 via the macro BS 100, and perform uplink scheduling for the UE 120 based on the obtained power headroom information.

Figure 2B:
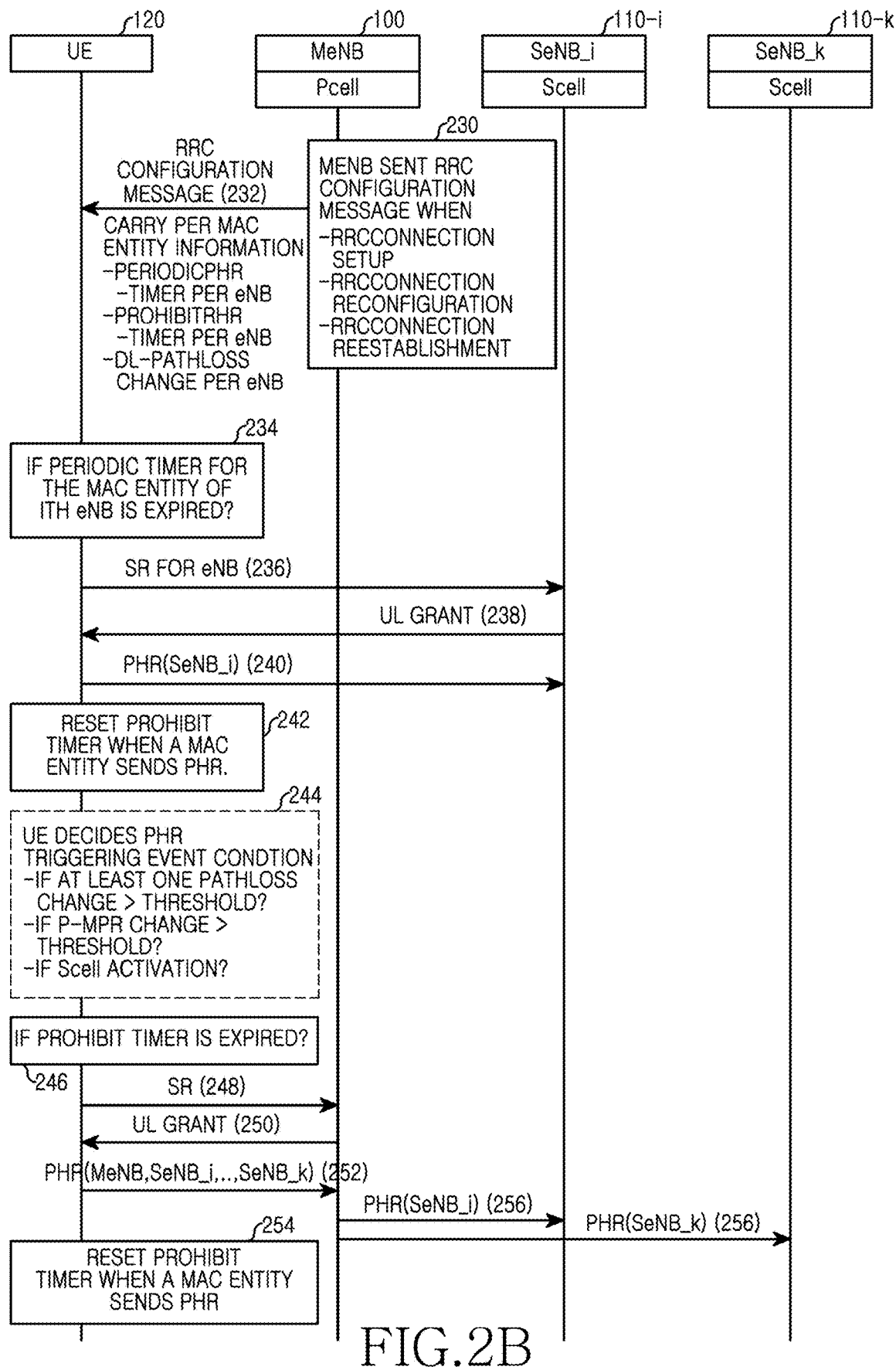
FIG. 2B is a view illustrating a detailed procedure that transmits power headroom information of UE in a wireless communication system according to an embodiment of the present disclosure.

FIG. 2B is a view illustrating a detailed procedure that transmits power headroom information of UE in a wireless communication system according to an embodiment of the present disclosure.

Referring to FIG. 2B, a macro BS 100 may detect an RRC configuration message transmission event to the UE 120 in operation 230, and transmit the RRC configuration message including information for each MAC entity to the UE 120 in operation 232. The macro BS 100 may detect necessity of having to transmit an RRC configuration message for RRC connection setup with UE, RRC connection reconfiguration, or RRC connection reestablishment. The macro BS 100 may transmit an RRC configuration message including PHR related control information for each BS. Here, the PHR related control information for each BS may include a periodic timer for each BS, a prohibit timer for each BS, and a threshold for a path loss for each BS, etc. For example, the macro BS 100 may transmit an RRC configuration message including a periodic timer, a prohibit timer, and a threshold for a path loss for the macro BS 100. For another example, the macro BS 100 may transmit an RRC configuration message including a periodic timer, prohibit timers, and a threshold for a path loss for each of the macro BS and a plurality of small BSs. Here, in the case where the macro BS 100 transmits an RRC configuration message including only a periodic timer, a prohibit timer, and a threshold for a path loss for the macro BS 100, a periodic timer, a prohibit timer, and a threshold for a path loss for small BSs 110-*i* to 110-*k* may be transmitted via an RRC message from each of the small BSs. According to an embodiment of the present disclosure, though not shown, it is assumed that the UE 120 forms a transmission link with each of the macro BS 100 and at least one of the small BSs 110-*i* to 110-*k*. Accordingly, the UE 120 may receive PHR related control information for a relevant BS via an RRC message of each of the macro BS 100 and the small BSs 110-*i* to 110-*k*. Here, PHR related control information of the macro BS and PHR related control information of a small BS may be different from each other or may be the same.

The UE 120 detects whether a periodic timer for an MAC entity of a specific BS among a plurality of BSs whose transmission links have been formed expires in operation 234 to detect occurrence of a Power Headroom Report (PHR) event. Here, it is assumed that a periodic timer for an MAC entity corresponding to an i-th small BS 110-*i* has expired. The UE 120 detects occurrence of a power headroom report event by expiration of a periodic timer, transmits a scheduling request message requesting uplink resource allocation to the i-th small BS 110-*i* in operation 236, and receives an UL grant message including uplink resource allocation information from the i-th small BS 110-*i* in operation 238. The UE 120 transmits a power headroom report message including power headroom information of the UE 120 to the i-th small BS 110-I using the allocated uplink resource in operation 240.

The UE 100 that has transmitted the power headroom report message resets a prohibit timer in operation 242. For example, when an MAC entity corresponding to the i-th small BS 110-*i* transmits a power headroom report message, the UE 120 initializes and restarts a prohibit timer for the i-th small BS 110-*i*.

After that, the UE 100 detects whether a PHR trigger event occurs by a PHR triggering event condition in operation 244. For example, the UE 120 may detect at least one of a path loss change, a P-Maximum Power Reduction (MPR), Scell activation, and a power back off by an MAC entity corresponding to at least one BS among a plurality of BSs whose wireless links have been connected to detect an event for triggering a power headroom report. For more detailed example, in the case where a path loss change amount is greater than a threshold by an MAC entity corresponding to at least one BS, the UE 120 may detect occurrence of a PHR triggering event. A power loss value may be measured based on reception power of a reference symbol received from a BS corresponding to an MAC entity. For another example, in the case where a P-MPR change amount is greater than a threshold, the UE 120 may detect occurrence of a PHR triggering event.

In the case where the UE 120 detects occurrence of a power headroom report event in operation 244, the UE 120 determines whether a prohibit timer expires in operation 246. In the case where the prohibit timer expires, the UE 120 determines a circumstance where a power headroom report is possible, and transmits a scheduling request message requesting uplink resource allocation to the macro BS 100 in operation 248, and receives an UL grant message including uplink resource allocation information from the macro BS 100 in operation 250.

The UE 120 transmits a power headroom report message including power headroom information of the UE 120 to the macro BS 100 using the allocated uplink resource in operation 234. At this point, the UE 120 may estimate a power headroom for each of the plurality of BSs whose links have been formed, and transmit a power headroom report message including power headroom information for each BS to the macro BS 100. For example, the UE 120 may transmit a power headroom report message to the macro BS 100 regardless of a BS that has detected a PHR trigger event of operation 244. Also, the UE 120 resets a prohibit timer of the BSs which received new PHR reports in operation 254. For example, when an MAC entity corresponding to the macro BS 100 transmits a power headroom report message, the UE 120 initializes and restarts a prohibit timer for the macro BS and other Scell BSs which updated this new PHR reports 100.

The macro BS 100 that has been reported the power headroom from the UE 120 may determine the UE 120 is being connected to one or more small BSs 110-*i* to 110-*k*, and transmit power headroom information of the UE 120 to a relevant small BS 110-*i*, 110-*k* in operation 256. At this point, the macro BS 100 may transmit power headroom information to the small BSs 110-*i* to 110-*k* via an X2 interface.

The order of PHR triggering event based on periodic timer and others in operation 244 can be decided following which event is happen in advance.

However, according to the above method where a specific BS transmits power headroom information of the UE to other BSs, a maximum delay of 60 msec may occur depending on the kind of a backhaul connecting BSs, and a power headroom of the UE 120 may change during this delay time. In this case, the small BSs 110-*i* to 110-*k* cannot immediately recognize that the power headroom of the UE 120 changes, and performs uplink scheduling using the previous power headroom, so that a transmission error of the system or deterioration of a wireless resource efficiency may occur.

Therefore, the present specification proposes, as another embodiment, a method for reporting, at a UE, a changed power headroom to a specific BS and other BSs in the case where a power headroom of the UE is changed by uplink scheduling of a specific BS among a plurality of BSs to which the UE is connected.

Figure 3A:
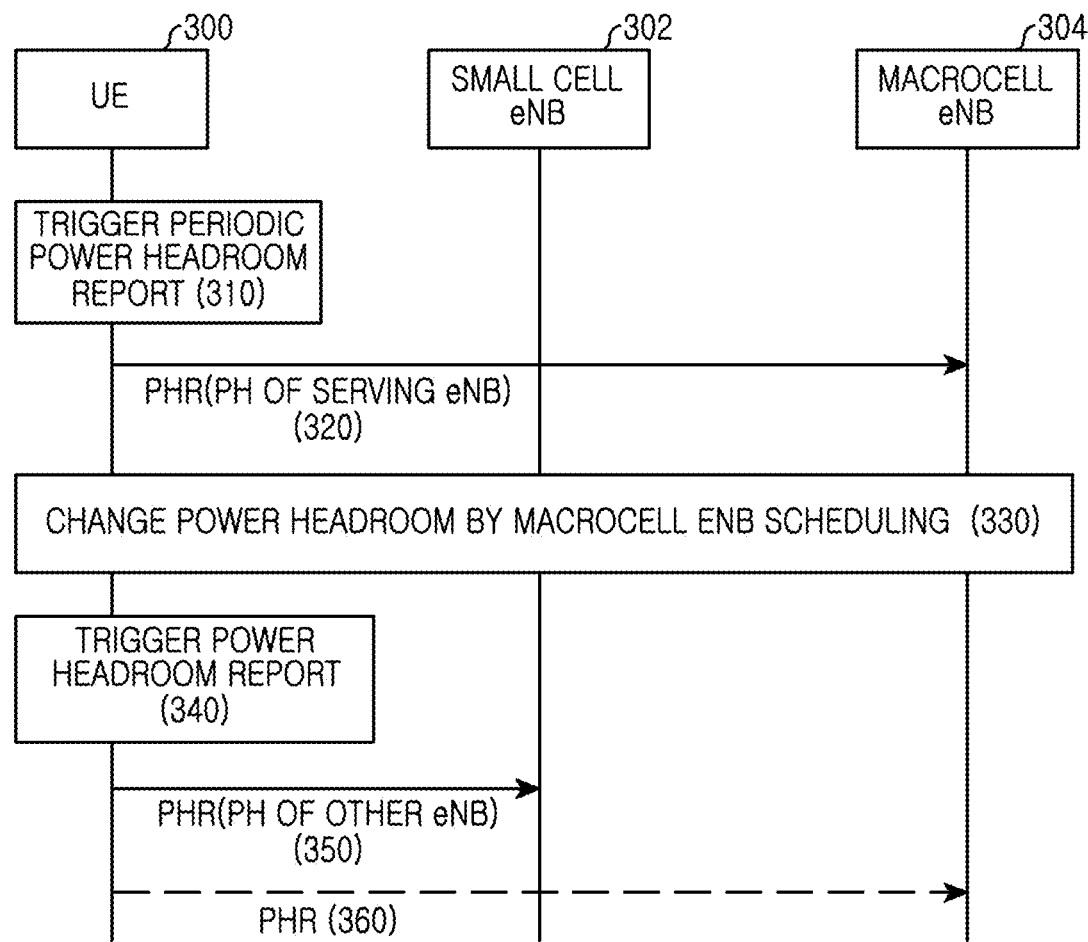
FIG. 3A is a view illustrating a signal flow performing a power headroom report on a plurality of BSs to which a UE is being wirelessly connected in a wireless communication system according to an embodiment of the present disclosure.

FIG. 3A is a view illustrating a signal flow performing a power headroom report on a plurality of BSs to which a UE is being wirelessly connected in a wireless communication system according to an embodiment of the present disclosure.

Referring to FIG. 3A, a UE 300 detects occurrence of a PHR event in operation 310. The UE 300 may detect whether a PHR event occurs based on a periodic timer, a prohibit timer, a path loss value, a threshold for a power headroom change, and a timer for a power headroom change. For another example, the UE 300 may detect at least one of a path loss change, an MPR, Scell activation, and power back off by a MAC entity corresponding to at least one BS among two BSs connected via a wireless link to detect an event for triggering a power headroom report. For another example, the UE 300 may detect occurrence of an event for triggering a power headroom report by periodic power headroom report or reconfiguration for each BS via a MAC entity corresponding to each of two BSs. Here, the periodic timer, the prohibit timer, and the path loss value are the same as those described in FIGS. 2A and 2B. Also, a threshold for a power headroom change means a value for controlling a power headroom report to be triggered when a power headroom of UE is changed by a predetermined amount or more by uplink scheduling of a BS. For example, in the case where q UE uses transmission power of 70 mW by uplink scheduling of a BS among a power headroom of 200 mW while the power headroom of the UE is 200 mW, the power headroom amount reduces by 70 mW and becomes 130 mW. At this point, when a threshold for a power headroom change is 20 mW, since the power headroom change amount of 70 mW is greater than the threshold of 20 mW, the UE may trigger a power headroom report. For another example, in the case where the UE additionally uses transmission power of 10 mW by uplink scheduling of a BS among a power headroom of 130 mW while the power headroom of the UE is 130 mW, the power headroom amount reduces by 10 mW and becomes 120 mW. At this point, when a threshold for a power headroom change is 20 mW, since the power headroom change amount of 10 mW is less than the threshold of 20 mW, the UE may control a power headroom report not to be triggered. In addition, a timer for a power headroom change means a value that controls a power headroom report to be triggered when a circumstance where a power headroom of the UE is changed by a predetermined amount by uplink scheduling of a BS is maintained for a predetermined time or more. For example, in the case where a threshold for a power headroom change is 20 mW and a timer for a power headroom change is 5, in the case where a power headroom is changed from 150 mW to a value smaller than 150 mW by 20 mW or more (that is, a value equal to or less than 130 mW) by uplink scheduling of a BS and then the power headroom is maintained as a value equal to or less than 130 mW for 5 subframes, the UE may trigger a power headroom report. For another example, in the case where a power headroom is changed from 150 mW to a value smaller than 150 mW by 20 mW or more (that is, a value equal to or less than 130 mW) by uplink scheduling of a BS but the power headroom is not maintained as a value equal to or less than 130 mW for 5 subframes, the UE may control the power headroom report not to be triggered.

Here, the UE may receive a periodic timer, a prohibit timer, a threshold for a path loss, a threshold for a power headroom change, and a timer for a power headroom change via a RRC message as illustrated in Table 1 below. Description of Table 1 below is equally applicable to FIGS. 2A and 2B.

TABLE 1

| Table 1PHR-Config setup | |
|---|---|
| periodic PHR-Timer | Timer_1 |
| prohibitPHR-Time | Time_1 |
| dl-PathlossChange | Threshold_1 |
| Ch_PH-Threshold | Threshold_2 |
| Ch_PH-Timer | Time_2 |

Here, PHR-Config means a field including control information related to a PHR in an RRC message, periodic PHR-Timer means a periodic timer that controls a power headroom report to be triggered periodically, and prohibit PHR-Time means a time section that controls a power headroom report not to be controlled. At this point, prohibit PHR-Time may be set to a measurement time of the prohibit timer. Also, dl-PathlossChange means a threshold for a path loss, Ch_PH-Threshold means a threshold for a power headroom change, and Ch_PH-Timer means a timer for a power headroom change. For another example, the UE may receive a periodic timer, a prohibit timer, a threshold for a path loss, a threshold for a power headroom change, and a timer for a power headroom change via an RRC message from a small BS 304. For example, various parameters used for detecting a power headroom report trigger event may be received from a macro BS and a small BS.

The UE 300 estimates a power headroom, and reports the estimated power headroom to a macro BS 304 in operation 320. At this point, the macro BS 304 may estimate uplink maximum transmission power supportable by the UE based on power headroom information of the UE 300, and perform uplink scheduling such as a Transmit Power Control (TPC), a Modulation and Coding Scheme (MCS) level, a bandwidth, etc. within a range that does not depart from the estimated uplink maximum transmission power.

The UE 300 detects a power headroom changed by uplink scheduling of the macro BS 304 in operation 330. After that, the UE 300 detects occurrence of a power headroom report event for triggering a power headroom report in operation 340. Here, the UE 300 may detect whether an event for triggering a power headroom report based on a periodic timer, a prohibit timer, a threshold for a path loss, a threshold for a power headroom change, and a timer for a power headroom change. For example, in the case where an amount by which a power headroom changes by scheduling of the macro BS 304 is equal to or greater than Ch-PH-Threshold, the UE 300 may detect occurrence of a power headroom report event and trigger a power headroom report. For another example, in the case where a change amount of a power headroom is maintained as a value equal to or greater than Ch-PH-Threshold for a time of Ch_PH-Timer or more by scheduling of the macro BS 304, the UE 300 may detect occurrence of a power headroom report event and trigger a power headroom report. Here, the UE 300 calculates a power headroom of a point at which a power headroom report of the macro BS 304 has been triggered, and generates a power headroom report message representing the calculated power headroom. For another example, the UE 300 may calculate an average value for power headrooms for a time corresponding to Ch_PH-Timer, and generate a power headroom report message representing an average power headroom.

The UE 300 transmits a power headroom report message to a small BS 302 in operation 350. Additionally, the UE 300 may transmit a power headroom report message to the macro BS 304 in operation 360. For example, the UE 300 may transmit the power headroom report message generated in operation 340 to both the small BS 302 and the macro BS 304, and may transmit the power headroom report message to one of the small BS 302 and the macro BS 304.

Figure 3B:
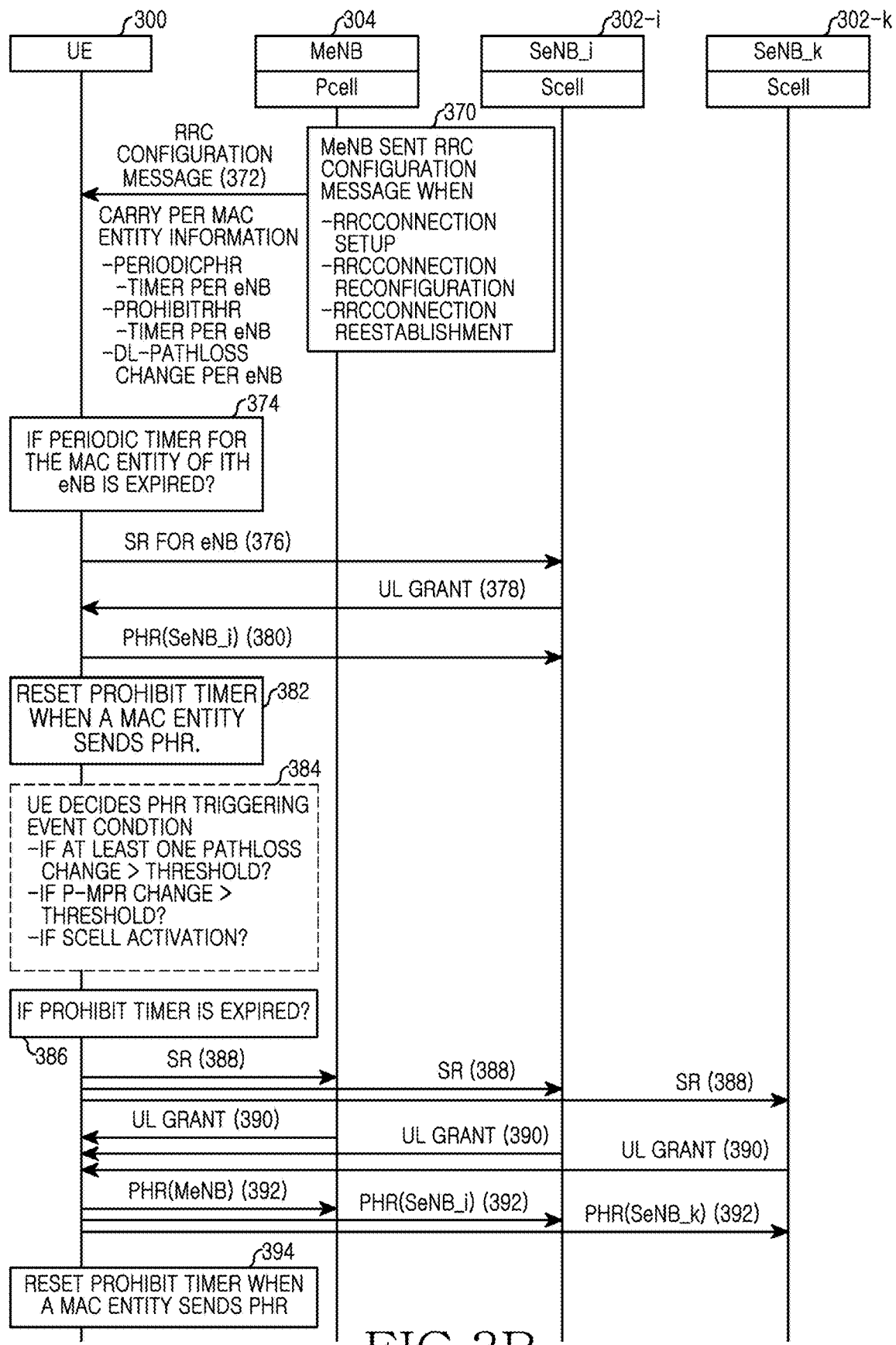
FIG. 3B is a view illustrating a detailed signal flow performing a power headroom report on a plurality of BSs to which a UE is being wirelessly connected in a wireless communication system according to an embodiment of the present disclosure.

FIG. 3B is a view illustrating a detailed signal flow performing a power headroom report on a plurality of BSs to which a UE is being wirelessly connected in a wireless communication system according to an embodiment of the present disclosure. Here, since operations 370 to 386 of FIG. 3B are the same as operations 230 to 246 of FIG. 2B, description thereof is omitted for convenience in description.

Referring to FIG. 3B, in the case where a prohibit timer expires as a result of the determination in operation 386, the UE 300 determines a circumstance where power headroom report is possible, transmits a scheduling request message requesting uplink resource allocation to each of a plurality of BSs 302-i to 302-k, 304 that are being wirelessly connected in operation 388, and receives an UL grant message including uplink resource allocation information from each of the plurality of BSs 302-i to 302-k, 304 in operation 390.

The UE 300 transmits a power headroom report message including power headroom information of the UE 300 to each of the plurality of BSs 302-i to 302-k, 304 using an uplink resource allocated by each of the plurality of BSs 302-i to 302-k, 304 in operation 392. At this point, the UE 300 may estimate power headroom for each of the plurality of BSs, generate a power headroom report message including power headroom information for a relevant BS for each BS, and transmit the same. Also, when an MAC entity transmits a power headroom report message, the UE 300 may initialize and restart a prohibit timer for at least one BS corresponding to the MAC entity.

Figure 4A:
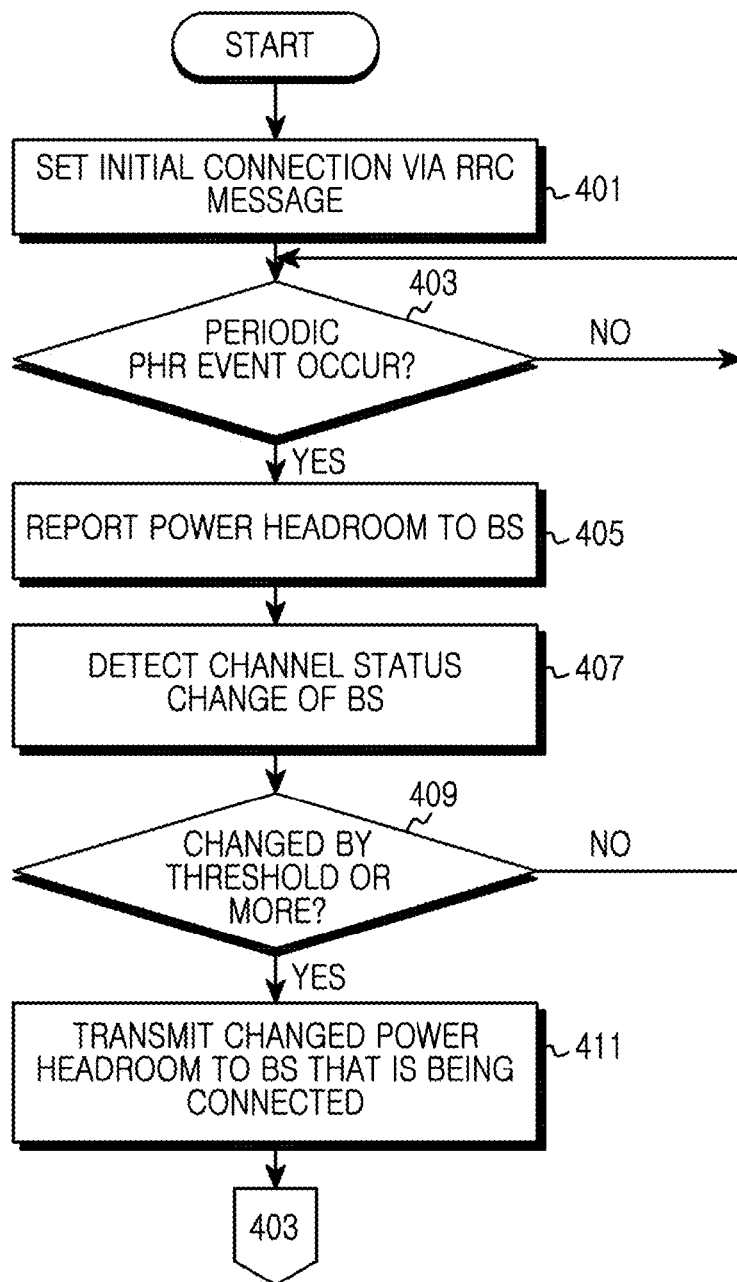
FIG. 4A is a flowchart illustrating an operation procedure that performs a power headroom report on a plurality of BSs to which a UE is being wirelessly connected in a wireless communication system according to an embodiment of the present disclosure.

FIG. 4A is a flowchart illustrating an operation procedure that performs a power headroom report on a plurality of BSs to which UE is being wirelessly connected in a wireless communication system according to an embodiment of the present disclosure.

Referring to FIG. 4A, the UE 300 performs initial connection via an RRC message in operation 401. At this point, the UE may perform initial connection procedures on a macro BS 304 and a small BS 302, respectively, to form two transmission links for the two BSs 302 and 304. At this point, the UE 300 may receive PHR related control information as illustrated in Table 1 via an RRC message of each of the macro BS and the small BS. Here, PHR related control information of the macro BS and PHR related control information of the small BS may be different from each other or may be the same.

After that, the UE 300 detects whether a periodic PHR event occurs in operation 403. For example, the UE 300 determines periodic PHR-Timer and prohibit PHR-Time from an RRC message of at least one of the macro BS and the small BS to set a periodic timer and a prohibit timer and determines whether a power headroom report trigger condition by the periodic timer and the prohibit timer is met. Here, the periodic timer and the prohibit timer may be different or may be the same for each BS. In the case where the periodic timer and the prohibit timer are different for each BS, the UE 300 may determine whether a power headroom report trigger condition by the periodic timer and the prohibit timer of the macro BS is met, or whether a power headroom report trigger condition by the periodic timer and the prohibit timer of the small BS is met. The periodic timer and the prohibit timer may start or restart when each MAC entity transmits a power headroom report.

In the case where a periodic PHR event occurs, the UE 300 proceeds to operation 405 to perform a power headroom report on the BS 304. For example, in the case where a periodic PHR event occurs, the UE 300 performs power headroom report on a BS that has generated the periodic PHR event. More specifically, in the case where the periodic PHR event has been generated by the periodic timer of the macro BS, the UE 300 may perform power headroom report on the macro BS. In the case where the periodic PHR event has been generated by the periodic timer of the small BS, the UE 300 may perform power headroom report on the small BS.

After that, the UE 304 detects an uplink channel status of a specific BS among BSs whose transmission links have been formed changes in operation 407. For example, the UE 304 may detect a power headroom is changed by uplink scheduling of the macro BS, or detect a power headroom is changed by uplink scheduling of the small BS. Here, the UE 304 may detect a power headroom is changed by a path loss change for a specific BS, a P-MPR, Scell activation, a power back off change, etc.

After that, the UE 300 determines if a change amount of a power headroom by a channel status is equal to or greater than a threshold in operation 409. For example, the UE 300 determines a threshold for a power headroom change from PHR related control information received via an RRC message from a specific BS, and determines whether a change amount (or a change width) of a power headroom by uplink scheduling of a specific BS is equal to or greater than the threshold. For example, in the case where a power headroom of a point before the uplink scheduling is 150 mW and the threshold for the power headroom change is 20 mW, the UE determines whether a power headroom is changed from 150 mW to a value smaller than 150 mW by 20 mW or more (that is, a value equal to or less than 130 mW) by the uplink scheduling of the macro BS 304. Additionally, the UE 300 may determine a timer for a power headroom change from the PHR related control information received via an RRC message from a specific BS, and determine a change amount of the power headroom maintains a threshold or more for a time corresponding to the timer. For example, in the case where a power headroom of a point before the uplink scheduling is 150 mW, a threshold for a power headroom change is 20 mW, and a timer for a power headroom change is 5, the UE determines whether a power headroom is maintained as a value equal to or less than 130 mW during 5 subframes after the power headroom is changed from 150 mW to a value smaller than 150 mW by 20 mW or more (that is, a value equal to or less than 130 mW) by the uplink scheduling of the small BS 302.

If a change amount of the power headroom is less than the threshold, the UE 300 returns to operation 403 to re-perform subsequent operations. For example, in the case where a power headroom of a point before the uplink scheduling is 150 mW and a threshold for a power headroom change is 20 mW, in the case where a power headroom is changed from 150 mW to 140 mW smaller than 150 mW by 10 mW by the uplink scheduling of the macro BS 304, the UE determines the change amount of the power headroom is less than the threshold, and determines a periodic PHR event occurs.

In contrast, in the case where the change amount of the power headroom is equal to or greater than the threshold, the UE 300 proceeds to operation 411 to transmit a power headroom report message representing the changed power headroom to at least one of the macro BS 304 and the small BS 302 that are being connected. For example, in the case where a power headroom of a point before uplink scheduling is 150 mW and a threshold for a power headroom change of the macro BS is 20 mW, in the case where a power headroom is changed from 150 mW to 110 mW which is a value smaller than 150 mW by 20 mW or more by uplink scheduling of the macro BS, the UE may generate a power headroom report message representing the changed 110 mW and transmit the same to the macro BS and the small BS 302. For another example, in the case where a power headroom of a point before uplink scheduling is 200 mW and a threshold for a power headroom change is 10 mW, in the case where a power headroom is changed from 200 mW to 180 mW which is a value smaller than 200 mW by 10 mW or more by uplink scheduling of the small BS, the UE may generate a power headroom report message representing the changed 180 mW and transmit the same to the macro BS and the small BS 302. After that, the UE 300 returns to operation 403 to re-perform subsequent operations.

Figure 4B:
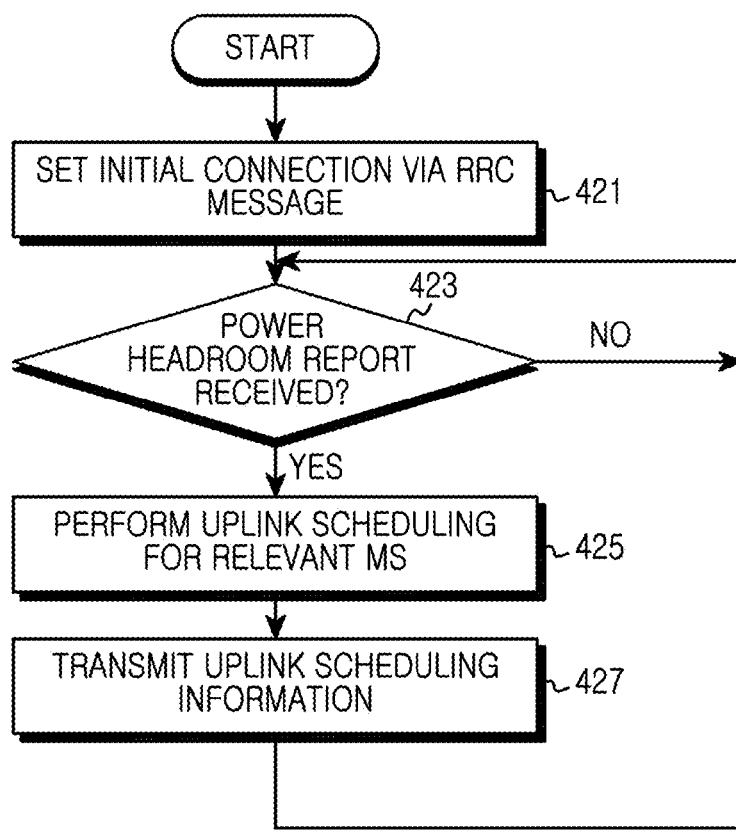
FIG. 4B is a flowchart illustrating an operation procedure of a BS, for receiving a power headroom report from a UE in a wireless communication system according to an embodiment of the present disclosure.

FIG. 4B is a flowchart illustrating an operation procedure of a BS, for receiving a power headroom report from UE in a wireless communication system according to an embodiment of the present disclosure.

Referring to FIG. 4B, a macro BS 304 performs initial connection with the UE 300 using an RRC message in operation 421. At this point, the RRC message may include PHR related control information as illustrated in Table 1.

After that, the macro BS 304 determines whether a power headroom report message is received from the UE 300 in operation 423. When the power headroom report message is received, the macro BS 304 performs uplink scheduling for a relevant UE in operation 425. For example, the macro BS 304 may estimate uplink maximum transmission power supportable by the UE based on power headroom information of the UE, and perform uplink control such as a TPC, an MCS level, a bandwidth, etc. within a range that does not depart from the estimated uplink maximum transmission power.

After that, the macro BS 304 transmits uplink scheduling information to the UE 300 in operation 427, and returns to operation 423 to re-perform subsequent operations.

The embodiments of FIGS. 3, 4A, and 4B have described that the UE detects whether an event for triggering a power headroom report occurs based on a change amount of a power headroom by uplink scheduling and/or a time for which the change amount of the power headroom is met. However, according to various embodiments, the UE may detect an event for triggering a power headroom report based on at least one of a path loss change, an MPR, Scell activation, and power back off via a MAC entity corresponding to at least one BS among two BSs. For another embodiment, the UE may detect an event for triggering a periodic power headroom report for a relevant BS or a power headroom report by reconfiguration independently via a MAC entity corresponding to a specific BS. Also, depending on an embodiment, the UE may transmit a power headroom report message generated based on a power headroom report trigger event detected by at least one of a plurality of BSs to only a relevant BS, or transmit the power headroom report message to the relevant BS and at least one different BS, simultaneously.

Also, as illustrated in FIGS. 3, 4A, and 4B, the embodiment of the present disclosure may report a power headroom change circumstance of a UE by transmission power allocation of a specific BS to other BSs by using a power headroom change amount by uplink scheduling and/or a time for which a power headroom change amount is met as a condition of a power headroom report trigger event. However, according to this method, a result thereof may change depending on which BS a power headroom report is performed among BSs to which the UE is connected. Therefore, the above embodiment has a difficulty in obtaining an optimized performance with respect to all transmission links.

Therefore, an embodiment below describes a method for distributing in advance maximum transmission power of a UE to a plurality of BSs that are being connected to the UE, and adjusting transmission power distributed to respective BSs based on a channel state of the plurality of BSs and a data amount of an uplink buffer in order to obtain an optimized performance with respect to all transmission links.

Figure 5A:
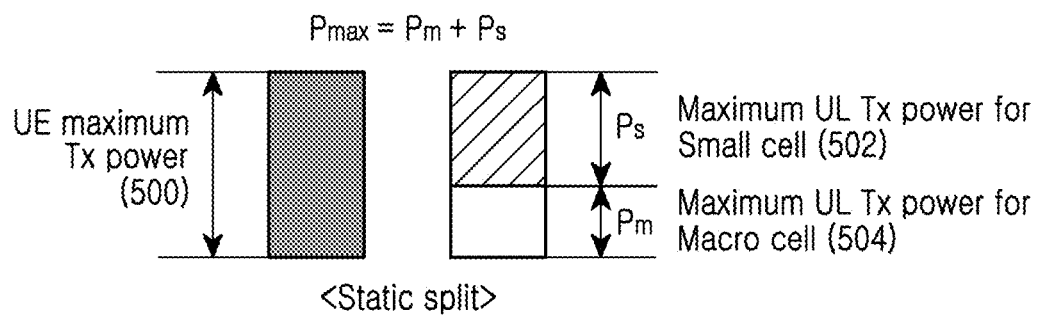
FIG. 5A is a view illustrating an example that distributes maximum transmission power to a plurality of BSs to which a UE is being wirelessly connected in a wireless communication system according to an embodiment of the present disclosure.

FIG. 5A is a view illustrating an example that distributes maximum transmission power to a plurality of BSs to which UE is being wirelessly connected in a wireless communication system according to an embodiment of the present disclosure.

As illustrated in FIG. 5A, an embodiment of the present disclosure determines uplink maximum transmission power $P_{max}$ 500 of UE, and divides the maximum transmission power 500 into maximum transmission power $P_s$ 502 for a small BS and maximum transmission power $P_m$ 504 for a macro BS. That is, the maximum transmission power 502 for the small BS means maximum transmission power that may be used for a transmission link for a specific small BS under a circumstance where a UE forms transmission links with a plurality of BSs. Also, the maximum transmission power 504 for the macro BS means maximum transmission power that may be used for a transmission link for a specific macro BS under a circumstance where a UE forms transmission links with a plurality of BSs.

The maximum transmission power $P_s$ 502 for the small BS and the maximum transmission power $P_m$ 504 for the macro BS may be distributed based on parameters such as Aggregated Maximum Bit Rate (AMBR) for each of a plurality of BSs that are being connected, a path loss, an uplink channel state quality, a bandwidth, and/or a weight factor.

Uplink maximum transmission power of a UE may be distributed in the following manner based on each parameter.

1) Aggregated Maximum Bit Rate (AMBR)

A UE may determine maximum transmission power for each transmission link based on an AMBR for each uplink transmission link with respect to each BS. At this point, the UE may distribute more maximum transmission power to a BS of a transmission link whose AMBR is high. That is, the UE may determine the maximum transmission power such that the maximum transmission power is proportional to an AMBR value of a transmission link. For example, the UE may distribute transmission power as illustrated in Equation (1) below.

$$P_m = \frac{AMBR_m}{AMBR_m + AMBR_s} P_{max}, \quad P_s = \frac{AMBR_{ms}}{AMBR_m + AMBR_s} P_{max} \quad \text{Equation (1)}$$

where $P_m$ is maximum transmission power for a macro BS, $P_s$ is maximum transmission power for a small BS, $AMBR_m$ is an AMBR for a macro BS, and $AMBR_s$ is an AMBR for a small BS, and $P_{max}$ is uplink maximum transmission power of UE. For example, under a circumstance where maximum transmission power of UE is 200 mW, a transmission link for a macro BS services Voice over IP (VoIP) traffic to enable a Quality of Service (QoS) service even for a frequent handoff, and a large capacity file of a best effort is transmitted via a transmission link for a small BS, assuming that an AMBR of a transmission link for a macro BS is 1 Mbps and an AMBR of a transmission link for a small BS is 4 Mbps, maximum transmission power for the macro BS may be determined as 40 (=(1/(1+4))*200), and maximum transmission power for the small BS may be determined as 160 (=(4/(1+4))*200).

2) A Path Loss or Channel State Quality Information

A UE may determine maximum transmission power for each transmission power based on a path loss for each uplink transmission link or channel state quality information with respect to each BS. Generally, since when a transmission region of a BS is small, a distance from a user is close and a channel environment is superior in a wireless communication system, the UE reflects this to distribute uplink maximum transmission power. The UE may determine maximum transmission power such that the maximum transmission power is inversely proportional to a path loss value of a transmission link.

3) A Bandwidth

A UE may determine maximum transmission power for each transmission link based on a spectrum bandwidth used for a transmission link of each BS. The UE may determine maximum transmission power such that the maximum transmission power is proportional to the bandwidth of a transmission link for each BS. For example, in the case where a bandwidth used for a transmission link of a macro BS is 10 MHz and a bandwidth used for a transmission link of a small BS is 40 MHz, the UE may divide maximum transmission power of 200 mW of the UE into 40 mW and 160 mW which is a ratio of 10:40.

4) Weight Factor

A UE may determine weight for a transmission link of each BS with consideration of rarity of each BS resource and/or the number of connected MSs (or network density), and determine maximum transmission power for each transmission link based on weight for each transmission link. For example, the UE may determine weight with consideration of costs generated when using a resource of each BS. For another example, the UE may determine weight with consideration of the number (network density) of simultaneously connected UEs for each BS.

According to an embodiment of the present disclosure, the UE may distribute maximum transmission power for each BS with consideration of two or more parameters among the above-described parameters.

For example, the UE may reflect an AMBR and weight simultaneously to distribute transmission power as illustrated in Equation (2) below.

$$P_m = \frac{AMBR_m w_m}{AMBR_m w_m + AMBR_s w_s} P_{max}, \quad \text{Equation (2)}$$

$$P_s = \frac{AMBR_{ms} w_m}{AMBR_m w_m + AMBR_s w_s} P_{max}$$

where $P_m$ is maximum transmission power for a macro BS, $P_s$ is maximum transmission power for a small BS, $AMBR_m$ is an AMBR for a macro BS, and $AMBR_s$ is an AMBR for a small BS, and $P_{max}$ is uplink maximum transmission power of UE. Also, $w_m$ is weight of the macro BS, and $w_s$ is weight of the small BS. For example, assuming that maximum transmission power of UE is 200 mW, an AMBR of a transmission link for a macro BS is 1 Mbps and an AMBR of a transmission link for a small BS is 4 Mbps, weight $w_m$ of the macro BS is 1, and weight $w_s$ of the small BS is 5, maximum transmission power for the macro BS may be determined as 10 (=(1*1/(1*1+4*5))*200), and maximum transmission power for the small BS may be determined as 190 (=(4*5/(1*1+4*5))*200).

For another example, the UE may reflect an AMBR, channel state information, a bandwidth, and weight simultaneously as in Equation (3) below to distribute transmission power.

$$P_m = \frac{AMBR_m h_s BW_m w_m}{AMBR_m h_s BW_m w_m + AMBR_s h_m BW_s w_s} P_{max} \quad \text{Equation (3)}$$

$$P_s = \frac{AMBR_s h_m BW_s w_s}{AMBR_m h_s BW_m w_m + AMBR_s h_m BW_s w_s} P_{max}$$

where $P_m$ is maximum transmission power for a macro BS, $P_s$ is maximum transmission power for a small BS, $AMBR_m$ is an AMBR for a macro BS, $AMBR_s$ is an AMBR for a small BS, and $P_{max}$ is uplink maximum transmission power of UE. Also, $w_m$ is weight of the macro BS, $w_s$ is weight of the small BS, $h_m$ is channel state information of the macro BS, $h_s$ is channel state information of the small BS, $BW_m$ is a bandwidth of the macro BS, and $BW_s$ is a bandwidth of the small BS.

For example, assuming that maximum transmission power of a UE is 200 mW, an AMBR of a transmission link for a macro BS is 1 Mbps and an AMBR of a transmission link for a small BS is 4 Mbps, weight $w_m$ of the macro BS is 1, weight $w_s$ of the small BS is 5, a bandwidth used for the transmission link of the macro BS is 10 MHz, a bandwidth used for the transmission link of the small BS is 40 MHz, and a ratio of channel state information of the macro BS and the small BS and/or a path loss value is 1:64, maximum transmission power for the macro BS may be determined as 88 (=(1*64*1*1/(1*64*1*1+4*1*4*5))*200), and maximum transmission power for the small BS may be determined as 112 (=(4*1*4*5/(1*64*1*1+4*1*4*5))*200).

Also, though the embodiment of the present disclosure has exemplarily described a case of distributing maximum transmission power to respective BSs using parameters such as an AMBR, a path loss, an uplink channel state quality, a bandwidth, and/or weight, maximum transmission power distribution is not limited to the above parameters but may be performed using parameters used for allocation of a general wireless resource.

According to an embodiment of the present disclosure, as illustrated in FIG. 5A, a UE distributes uplink maximum transmission power to a plurality of BSs that are being connected, and then in the case where a condition of a PHR trigger event is met, the UE may reflect a channel state of each BS and a state of an uplink buffer to adjust maximum transmission power distributed to each BS. Here, whether a trigger condition of a PHR event is met may be determined based on at least one of a path loss change, an MPR, S cell activation, and power back off via a MAC entity corresponding to at least one BS among two BSs. Whether a trigger condition of a PHR event is met may be determined independently based on a periodic timer or a reconfiguration event via a MAC entity corresponding to respective two BSs.

Figure 5B:
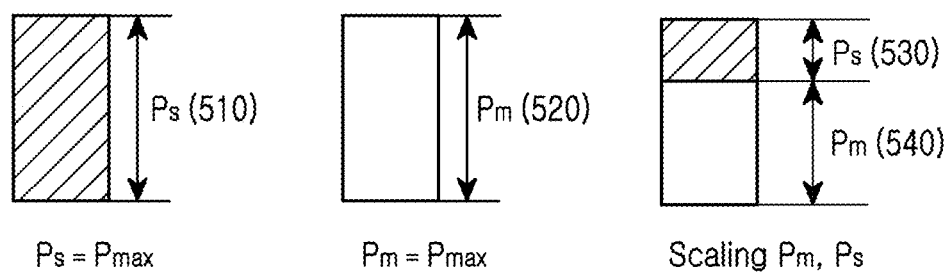
FIG. 5B is a view illustrating an example that adjusts transmission power distributed to a plurality of BSs to which a UE is being wirelessly connected in a wireless communication system according to an embodiment of the present disclosure.

FIG. 5B is a view illustrating an example that adjusts transmission power distributed to a plurality of BSs to which a UE is being wirelessly connected in a wireless communication system according to an embodiment of the present disclosure.

Referring to FIG. 5B, the UE may allocate ($P_s = P_{max}$) whole maximum transmission power $P_{max}$ 510 of the UE to only a small BS or allocate ($P_m = P_{max}$) whole maximum transmission power $P_m$ 520 to only a macro BS based on a channel state of each BS and a state of an uplink buffer. Also, the UE may adjust a ratio of maximum transmission power distributed to each BS (e.g., 530 and 540).

For example, when a data amount of an uplink buffer for a macro BS is equal to or less than a first threshold and a state where the data amount of the uplink buffer for the macro BS is equal to or less than the first threshold lasts for a threshold time or more, the UE may allocate all or a portion of maximum transmission power distributed to the macro BS to a small BS.

For another example, when a data amount of an uplink buffer for a small BS is equal to or less than the first threshold and a state where the data amount of the uplink buffer for the small BS is equal to or less than the first threshold lasts for a threshold time or more, the UE may allocate all or a portion of maximum transmission power distributed to the small BS to the macro BS.

For still another example, in the case where the data amount of the uplink buffer for the macro BS is greater than the first threshold and the data amount of the uplink buffer for the small BS is greater than the threshold, the UE may determine whether channel state information values for two BSs change to a second threshold or more for a threshold time. In the case where the channel state information values for the two BSs change to the second threshold or more for the threshold time, the UE may adjust maximum transmission power distributed to the two BSs with consideration of the data amount of the uplink buffer and the channel state information value. In contrast, in the case where the channel state information values for the two BSs do not change to the second threshold or more for the threshold time, the UE may maintain the initially distributed maximum transmission power without changing the maximum transmission power distributed to the two BSs.

Figure 6:
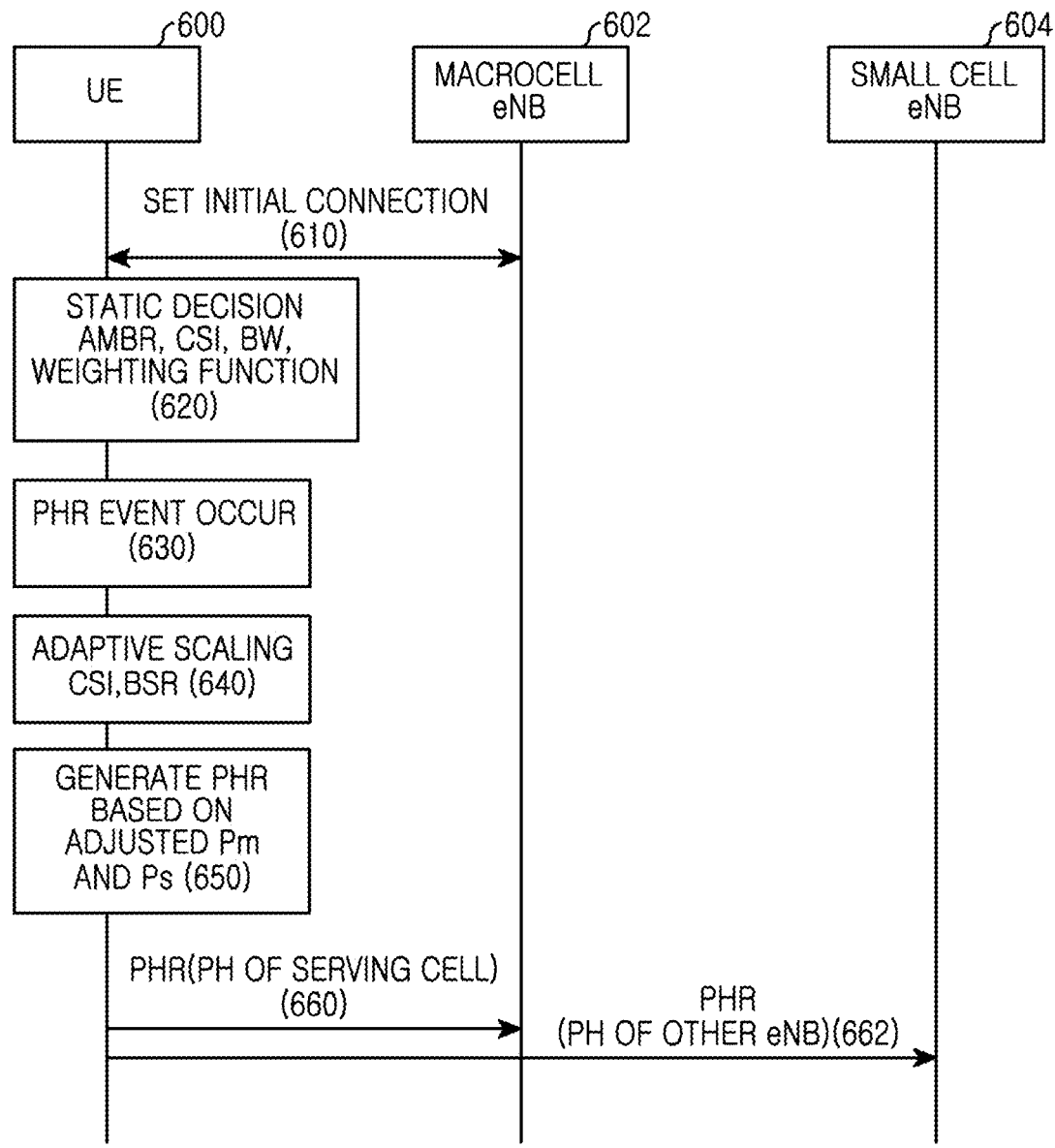
FIG. 6 is a view illustrating a signal flow where a UE distributes and adjusts maximum transmission power with respect to a plurality of BSs to which the UE is being wirelessly connected, and performing a power headroom report based on this in a wireless communication system according to an embodiment of the present disclosure.

FIG. 6 is a view illustrating a signal flow where a UE distributes and adjusts maximum transmission power with respect to a plurality of BSs to which UE is being wirelessly connected, and performing a power headroom report based on this in a wireless communication system according to an embodiment of the present disclosure.

Referring to FIG. 6, a UE 600 and a macro BS 602 perform initial connection setting in operation 610. At this point, the macro BS 602 may transmit an RRC message including PHR related control information illustrated in Table 2 below to the UE 600.

TABLE 2

| PHR-Config | |
|---|---|
| setup | |
| periodic PHR-Timer | Timer_1 |
| prohibitPHR-Time | Time_1 |
| dl-PathlossChange | Threshold_1 |
| Buffer_Threshold | Threshold_2 |
| Buffer_Timer | Time_3 |

Here, PHR-Config means a field including control information related to a PHR in an RRC message, periodic PHR-Timer means a periodic timer that controls a power headroom report to be triggered periodically, and prohibit PHR-Time means a time section that controls a power headroom report not to be controlled. At this point, prohibit PHR-Time may be set to a measurement time of the prohibit timer. Also, dl-PathlossChange means a threshold for a path loss, and Buffer_Threshold means a value compared with an uplink buffer data amount of each BS in order to determine whether adjustment of maximum transmission power distributed to each BS is required. Also, Buffer-Timer means a value compared with a time for which an uplink buffer data amount of each BS is maintained as a threshold or more in order to determine whether adjustment of maximum transmission power distributed to each BS is required. For example, the UE may compare an uplink buffer data amount of each BS with Buffer_Threshold to determine whether adjustment of maximum transmission power distributed to each BS is required. For another example, the UE may measure a time for which a state where an uplink buffer data amount of each BS is smaller than Buffer_Threshold is maintained, and compare the measured time with a time of Buffer-Timer to determine whether adjustment of maximum transmission power distributed to each BS is required.

When initial connection setting is completed, the UE 600 performs a static decision operation that distributes maximum transmission power of the UE 600 to a macro BS 602 and a small BS 604 that are being connected in operation 620. At this point, as illustrated in FIG. 5A, the UE 600 may distribute maximum transmission power to transmission power of the macro BS 602 and transmission power of the small BS 604 based on at least one of an AMBR, channel state information, a bandwidth, and a weight parameter. Depending on an embodiment, the UE 600 may distribute maximum transmission power using a parameter indicated by the macro BS 602 among the AMBR, the channel state information, the bandwidth, and the weight parameter. For example, the macro BS 602 may add a parameter to be used for maximum transmission power distribution to an RRC message illustrated in Table 2, and transmit the same to the UE 600.

After that, the UE 600 detects occurrence of a power headroom report trigger event in operation 630. For example, the UE 600 may detect occurrence of a power headroom report trigger event based on PHR related control information included in an RRC message illustrated in Table 2. For another example, the UE 600 may detect at least one of a path loss change, an MPR, Scell activation, and power back off via a MAC entity corresponding to at least one BS among two BSs connected via a wireless link to detect occurrence of an event for triggering a power headroom report. For still another example, the UE 600 may detect occurrence of an event for triggering a power headroom report by a periodic power headroom report or reconfiguration of each BS via a MAC entity corresponding to two BSs. As a more specific example, the UE 600 may detect occurrence of a periodic power headroom report trigger event based on at least one of a periodic PHR-Timer parameter and a prohibit PHR-Time parameter included in an RRC message. For further another example, the UE 600 may periodically measure a path loss for each of a plurality of BSs that are being connected to calculate a path loss change amount, and in the case where the calculated path loss change amount is greater than a dl-PathlossChange parameter included in an RRC message, the UE 600 may detect occurrence of a power headroom report trigger event.

The UE 600 that has detected occurrence of a power headroom report trigger event performs an adaptive scaling operation that adjusts an initially distributed transmission power amount on each of the macro BS 602 and the small BS 604 in operation 640. At this point, the UE 600 may periodically monitor an uplink buffer data amount for a plurality of BSs that are being connected, and in the case where an uplink buffer data amount for at least one BS becomes smaller than Buffer_Threshold included in an RRC message, or a state where an uplink buffer data amount for at least one BS that is being connected is smaller than Buffer_Threshold included in an RRC message is maintained for a time of Buffer-Timer included the RRC message, the UE 600 adjusts a ratio of transmission power initially distributed to each BS via a static decision operation. For another example, in the case where an uplink buffer data amount for a plurality of BSs that are being connected is greater than Buffer_Threshold included in the RRC message but a channel state change amount for at least one BS is equal to or greater than a threshold set in advance, the UE 600 may adjust a ratio of transmission power initially distributed to each BS via a static decision operation. Specifically, the UE 600 may control whole maximum transmission power $P_{max}$ of the UE to be allocated ($P_s=P_{max}$) to only the small BS 604 or may control whole maximum transmission power $P_{max}$ of the UE to be allocated ($P_m=P_{max}$) to only the macro BS 602 based on a channel state of each BS and a data amount of an uplink buffer. Also, the UE 600 may adjust a ratio of maximum transmission power distributed to the macro BS 602 and the small BS 604.

The UE 600 generates a transmission power headroom report message for the macro BS 602 and the small BS 604 based on the transmission power of the macro BS 602 and the small BS 604 adjusted by the adaptive scaling operation in operation 650. The UE 600 transmits a relevant power headroom report message to the macro BS 602 and the small BS 604 in operations 660 and 662. Here, for convenience, a description has been made to only initial connection setting between the UE 600 and the macro BS 602 in operation 610. However, it is natural that initial connection setting between the UE 600 and the small BS 604 should be performed before operation 620 (before a static decision operation is performed) in order to apply the embodiment of the present disclosure.

Figure 7A:
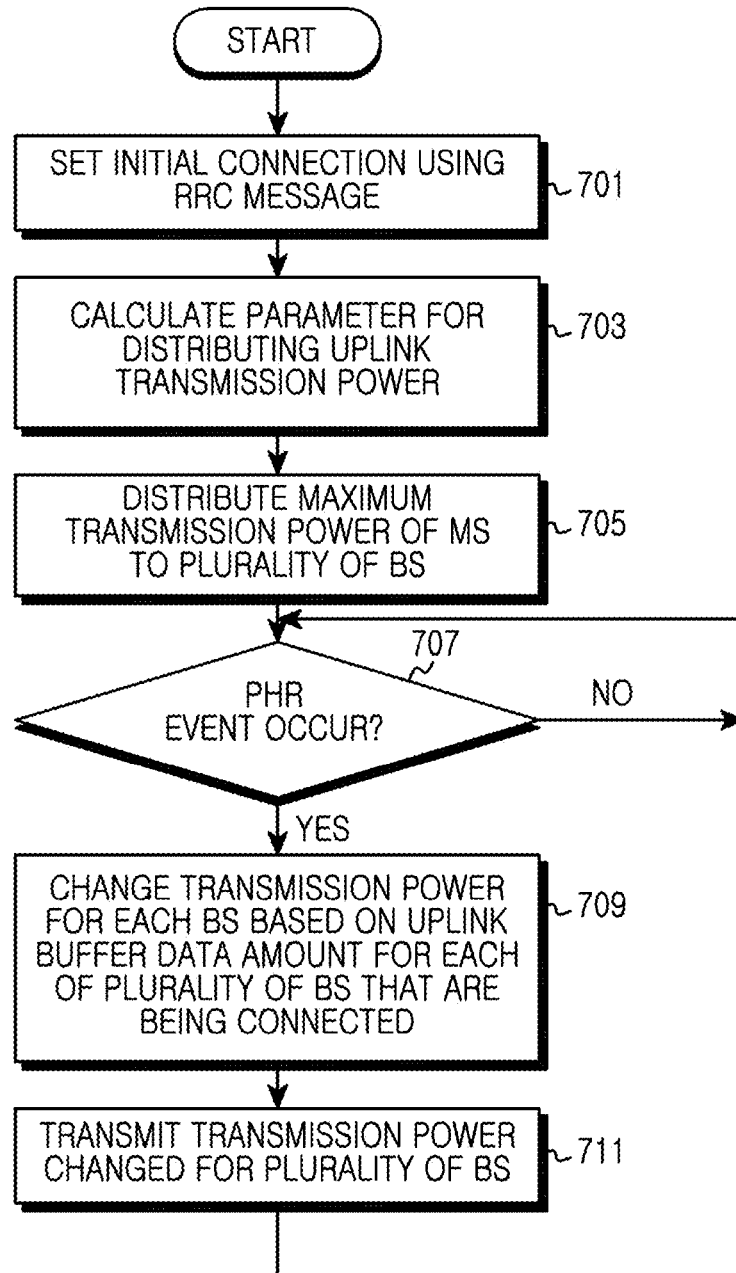
FIG. 7A is a flowchart illustrating an operation procedure where a UE distributes and adjusts maximum transmission power with respect to a plurality of BSs to which the UE is being wirelessly connected, and performs a power headroom report based on this in a wireless communication system according to an embodiment of the present disclosure.

FIG. 7A is a flowchart illustrating an operation procedure where a UE distributes and adjusts maximum transmission power with respect to a plurality of BSs to which UE is being wirelessly connected, and performs a power headroom report based on this in a wireless communication system according to an embodiment of the present disclosure.

Referring to FIG. 7A, the UE 600 performs initial connection setting using an RRC message in operation 701. At this point, the UE 600 may receive the RRC message including PHR related control information illustrated in Table 2 from the macro BS 602. Here, for convenience in description, it is assumed that the UE 600 has set connection with the small cell 602 in advance.

When initial connection setting is completed, the UE 600 calculates a parameter required for distributing uplink maximum transmission power of the UE in operation 703. For example, the UE may calculate at least one of an AMBR, channel state information, a bandwidth, and a weight parameter as illustrated in FIG. 5A with respect to each of the macro BS 602 and the small BS 604. Depending on an embodiment, the UE 600 may determine a maximum transmission power distribution method indicated by a BS via the RRC message, and calculate at least one parameter corresponding to the determined maximum transmission power distribution method with respect to the macro BS 602 and the small BS 604.

In operation 705, the UE 600 distributes maximum transmission power to a plurality of BSs that are being connected, that is, the macro BS 602 and the small BS 604 based on the calculated parameter. For example, the UE 600 may distribute transmission power to the macro BS 602 and the small BS 604 such that the transmission power is proportional to AMBRs of the macro BS 602 and the small BS 604. For another example, the UE 600 may distribute transmission power to the macro BS 602 and the small BS 604 such that the transmission power is inversely proportional to channel state information of the macro BS 602 and the small BS 604. For still another example, the UE 600 may distribute transmission power to the macro BS 602 and the small BS 604 such that the transmission power is proportional to a bandwidth of each of the macro BS 602 and the small BS 604. For yet another example, the UE 600 may distribute transmission power with consideration of service costs and the number of simultaneous connecting users of the macro BS 602 and the small BS 604.

After that, the UE 600 detects whether an event for triggering a power headroom report occurs in operation 707. For example, the UE 600 may detect occurrence of a power headroom report event based on PHR related control information included in an RRC message illustrated in Table 2. For another example, the UE 600 may detect at least one of a path loss change, an MPR, Scell activation, and power back off via a MAC entity corresponding to at least one BS among two BSs connected via a wireless link to detect an event for triggering a power headroom report. For still another example, the UE 600 may detect occurrence of an event for triggering a power headroom report by a periodic power headroom report or reconfiguration for each BS via a MAC entity corresponding to each of two BSs. For a more specific example, the UE 600 may detect occurrence of a periodic power headroom report trigger event based on at least one of a periodic PHR-Timer parameter and a prohibit PHR-Time parameter included in an RRC message. For another example, the UE 600 may periodically measure a path loss for each of a plurality of BSs that are being connected to calculate a path loss change amount, and in the case where the calculated path loss change amount is greater than a dl-PathlossChange parameter included in an RRC message, the UE 600 may detect occurrence of a power headroom report trigger event.

The UE 600 that has detected occurrence of the power headroom report trigger event adjusts transmission power for each BS based on an uplink buffer data amount for each of a plurality of BSs that are being connected in operation 709. At this point, the UE 600 may periodically monitor an uplink buffer data amount for a plurality of BSs that are being connected, and in the case where an uplink buffer data amount for at least one BS becomes smaller than Buffer_Threshold included in an RRC message, or a state where an uplink buffer data amount for at least one BS that is being connected is smaller than Buffer_Threshold included in an RRC message is maintained for a time of Buffer-Timer included the RRC message, the UE 600 adjusts a ratio of transmission power initially distributed to each BS via a static decision operation. For another example, in the case where an uplink buffer data amount for a plurality of BSs that are being connected is greater than Buffer_Threshold included in the RRC message but a channel state change amount for at least one BS is equal to or greater than a threshold set in advance, the UE 600 may adjust a ratio of transmission power initially distributed to each BS via a static decision operation. Specifically, the UE 600 may control whole maximum transmission power $P_{max}$ of the UE to be allocated ($P_s=P_{max}$) to only the small BS 604 or may control whole maximum transmission power $P_{max}$ of the UE to be allocated ($P_m=P_{max}$) to only the macro BS 602 based on a channel state of each BS and a data amount of an uplink buffer. Also, the UE 600 may adjust a ratio of maximum transmission power distributed to the macro BS 602 and the small BS 604. Here, a method for adjusting transmission power is described in more detail with reference to FIG. 7C.

In operation 711, the UE 600 generates a transmission power headroom report message for each of the macro BS 602 and the small BS 604 based on transmission power adjusted for the macro BS 602 and the small BS 604, and transmits the generated power headroom report messages to the macro BS 602 and the small BS 604, respectively. After that, the UE 600 returns to operation 707 to re-perform subsequent operations.

Figure 7B:
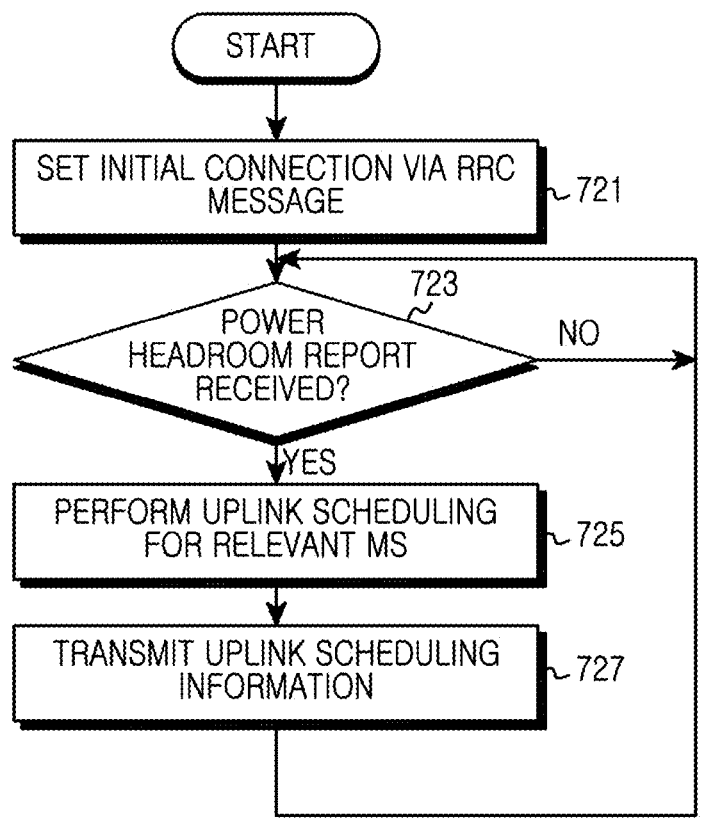
FIG. 7B is a flowchart illustrating an operation procedure of a BS, for receiving a power headroom report from a UE in a wireless communication system according to an embodiment of the present disclosure.

FIG. 7B is a flowchart illustrating an operation procedure of a BS, for receiving a power headroom report from a UE in a wireless communication system according to an embodiment of the present disclosure.

Referring to FIG. 7B, the macro BS 602 performs initial connection with the UE 600 using an RRC message in operation 721. At this point, the RRC message may include PHR related control information illustrated in Table 2.

After that, the macro BS 602 determines whether a power headroom report message is received from the UE 600 in operation 723. When the power headroom report message is received, the macro BS 602 performs uplink scheduling on a relevant UE in operation 725. For example, the macro BS 602 may estimate uplink maximum transmission power supportable by an MS based on the power headroom information of the MS, and perform uplink control such as TPC, an MCS level, a bandwidth, etc. within a range that does not depart from the estimated uplink maximum transmission power.

After that, the macro BS 602 transmits uplink scheduling information to the UE 600 in operation 727, and returns to operation 723 to re-perform subsequent operations.

Figure 7C:
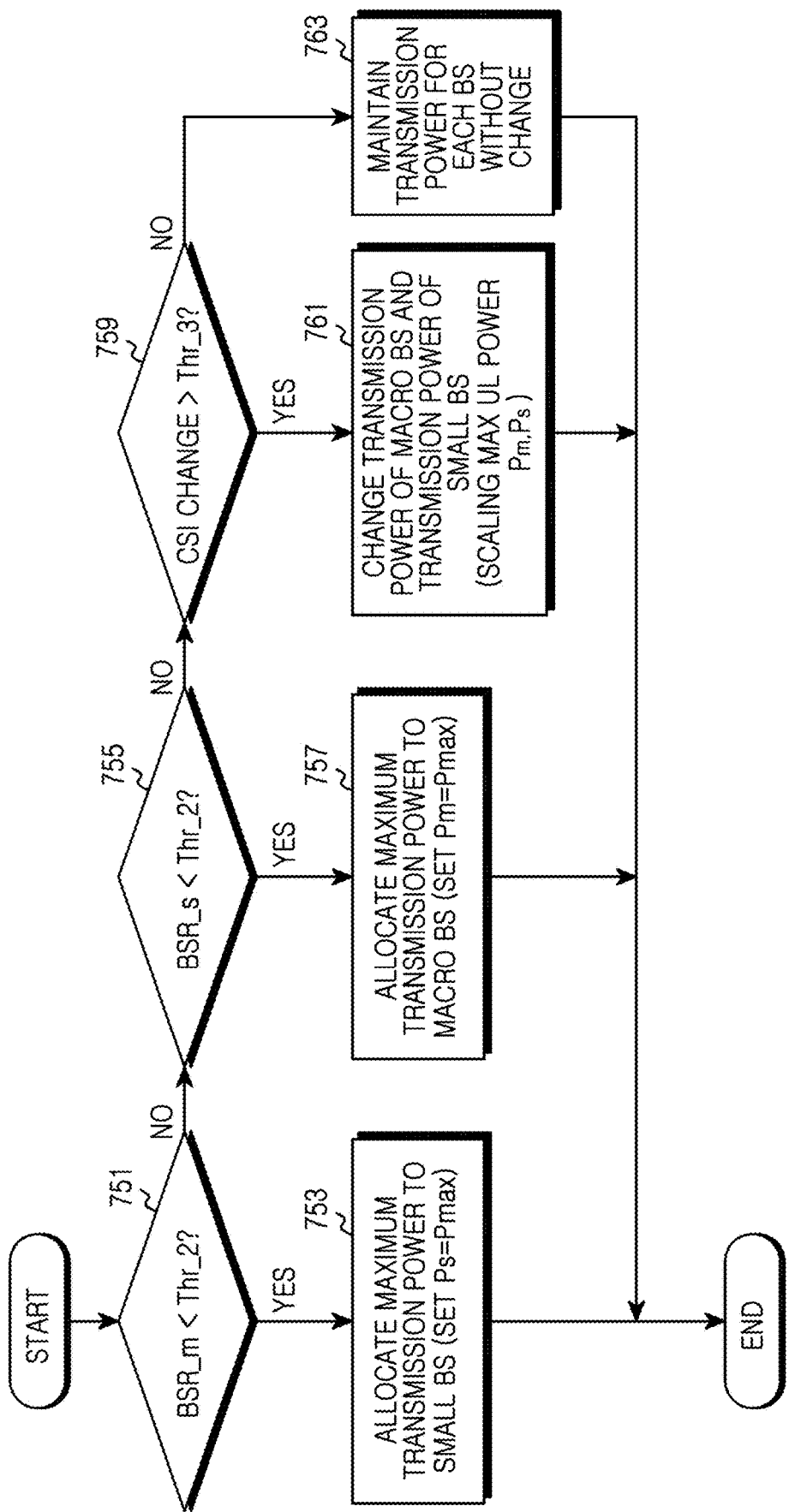
FIG. 7C is a flowchart illustrating an operation procedure where a UE adjusts uplink transmission power distribution for a plurality of BSs to which the UE is being wirelessly connected in a wireless communication system according to an embodiment of the present disclosure.

FIG. 7C is a flowchart illustrating a detailed operation procedure where UE adjusts uplink transmission power distribution for a plurality of BSs to which UE is being wirelessly connected in a wireless communication system according to an embodiment of the present disclosure.

Referring to FIG. 7C, the UE 600 determines whether a data amount BSR_m of an uplink buffer for the macro BS 602 is less than Buffer_Threshold (Thr_2) received via an RRC message illustrated in Table 2 in operation 751.

If the data amount of the uplink buffer for the macro BS 602 is less than the buffer threshold Thr_2, the UE 600 may allocate whole maximum transmission power $P_m$ of the UE to the small BS 604 in operation 753. Additionally, the UE 600 measures a time for which a state where the data amount of the uplink buffer for the macro BS 602 is less than the buffer threshold Thr_2 is maintained, and determines whether the measured time is equal to or greater than Buffer_Timer (Time 3) illustrated in Table 2 to allocate ($P_s=P_{max}$) the whole maximum transmission power $P_{max}$ of the UE to the small BS 604.

In contrast, in the case where the data amount of the uplink buffer for the macro BS 602 is equal to or greater than the buffer threshold Thr_2, the UE 600 determines whether a data amount of an uplink buffer for the small BS 604 is less than the buffer threshold Thr_2 in operation 755.

If the data amount of the uplink buffer for the small BS 604 is less than the buffer threshold Thr_2, the UE 600 may allocate the whole maximum transmission power $P_m$ of the UE to the macro BS 602 in operation 757. Additionally, the UE 600 measures a time for which a state where the data amount of the uplink buffer for the small BS 604 is less than the buffer threshold Thr_2 is maintained, and determines whether the measured time is equal to or greater than Buffer_Timer (Time 3) illustrated in Table 2 to allocate ($P_m=P_{max}$) the whole maximum transmission power $P_{max}$ of the UE to the macro BS 602.

In contrast, in the case where the data amount of the uplink buffer for the small BS 604 is equal to or greater than the buffer threshold Thr_2, that is, in the case where both the data amount of the uplink buffer for the macro BS 602 and the data amount of the uplink buffer for the small BS 604 is equal to or greater than the buffer threshold Thr_2, the UE 600 determines whether channel state information of at least one of the two BSs changes to a threshold set in advance or more in operation 759. In the case where channel state information of at least one of the two BSs changes to the threshold set in advance or more, the UE 600 changes transmission power $P_m$ currently distributed to the macro BS 602 and transmission power $P_s$ currently distributed to the small BS 604 in operation 761.

In contrast, in the case where channel state information of at least one of the two BSs does not change to the threshold set in advance or more, the UE 600 determines to maintain transmission power for each BS without changing the transmission power for each BS in operation 763.

Though a description has been made of a case where the UE performs a static decision operation that distributes uplink maximum transmission power of the UE to respective BSs that are being connected, and an adaptive scaling operation that adjusts transmission power distributed to respective BSs in FIGS. 5A to 7C, the operation that distributes the uplink maximum transmission power and/or the operation that adjusts the transmission power may be performed at a BS.

Figure 8:
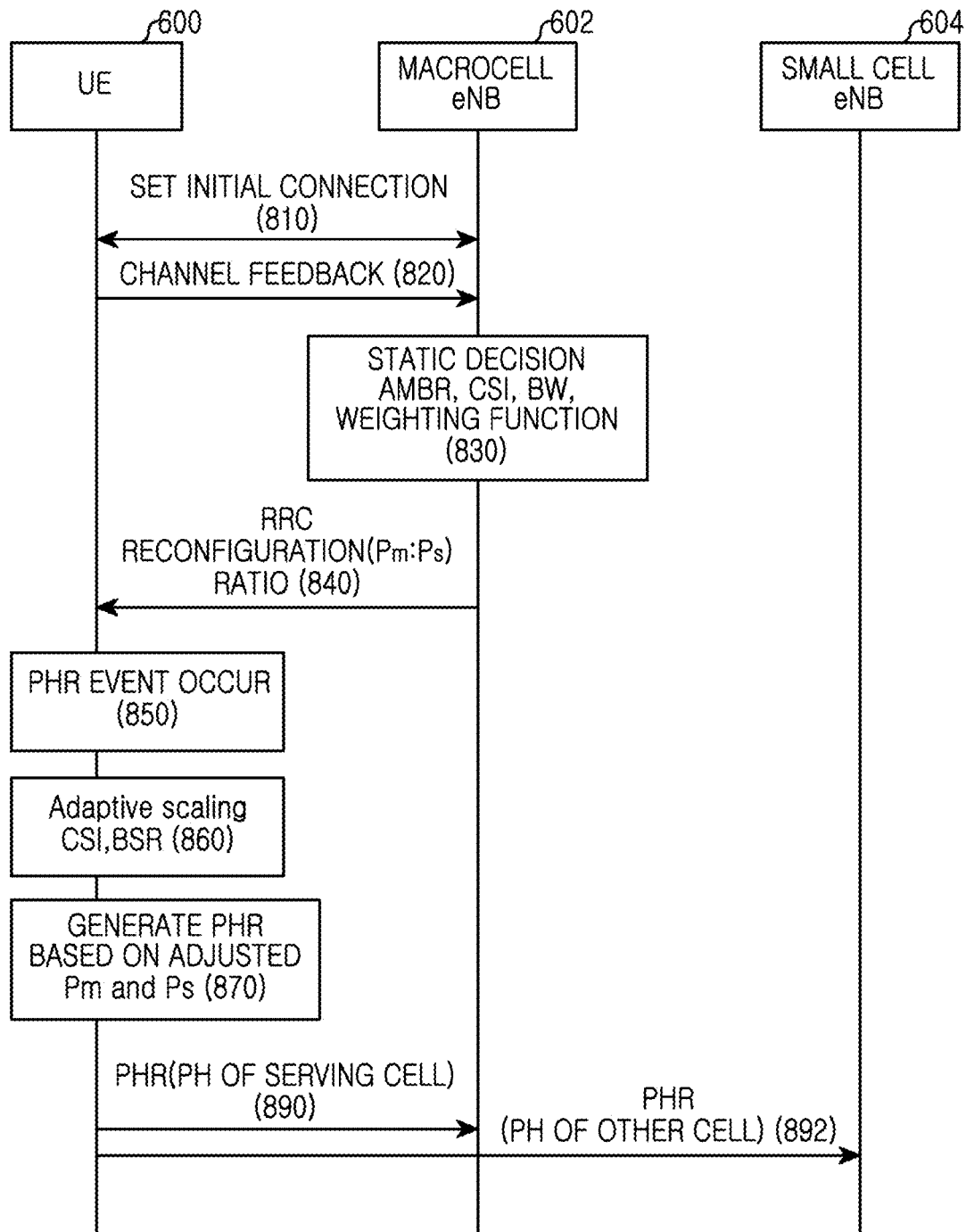
FIG. 8 is a view illustrating a signal flow where a BS distributes maximum transmission power of a UE and the UE performs a power headroom report on a plurality of BSs to which the UE is being wirelessly connected in a wireless communication system according to an embodiment of the present disclosure.
Figure 9A:
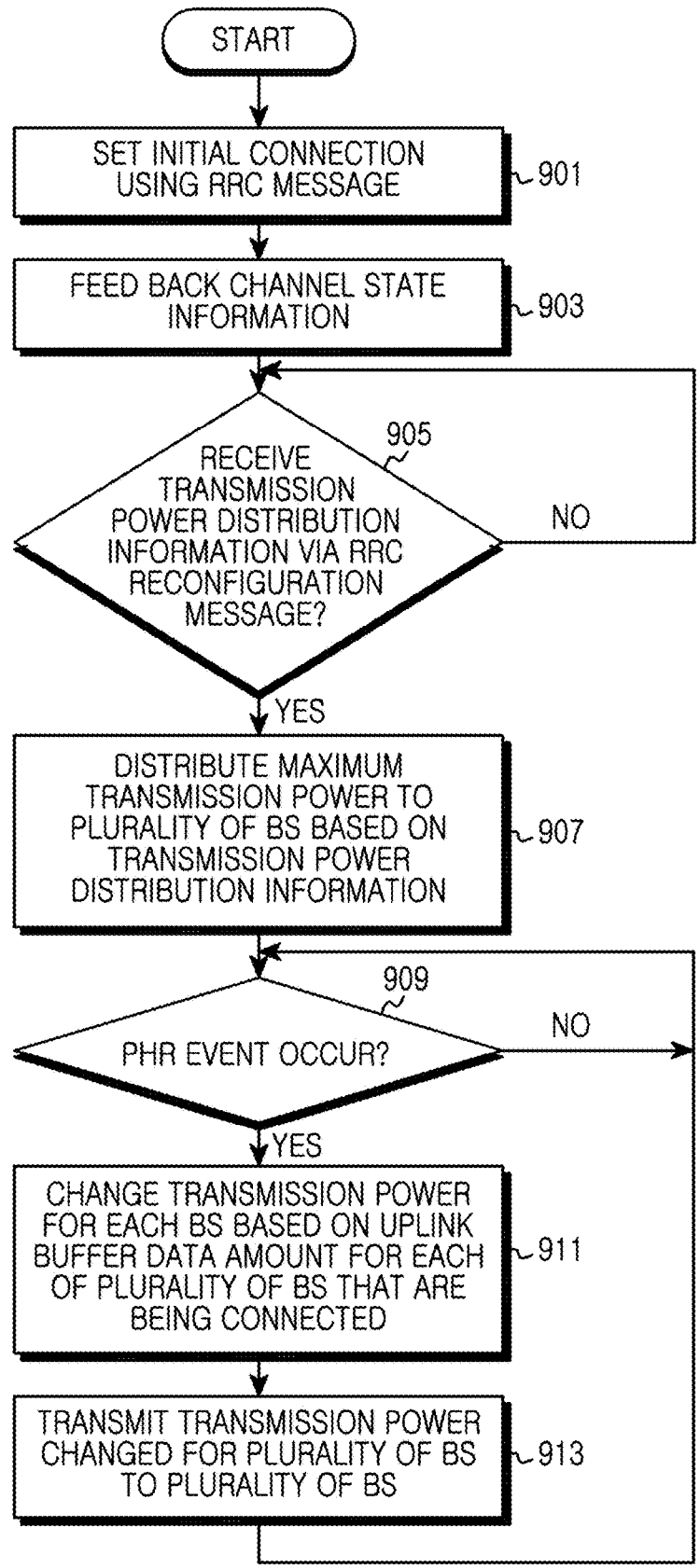
FIG. 9A is a flowchart illustrating an operation procedure where a UE performs a power headroom report on a plurality of BSs to which the UE is being wirelessly connected based on maximum transmission power distribution information received from a BS in a wireless communication system according to an embodiment of the present disclosure.
Figure 9B:
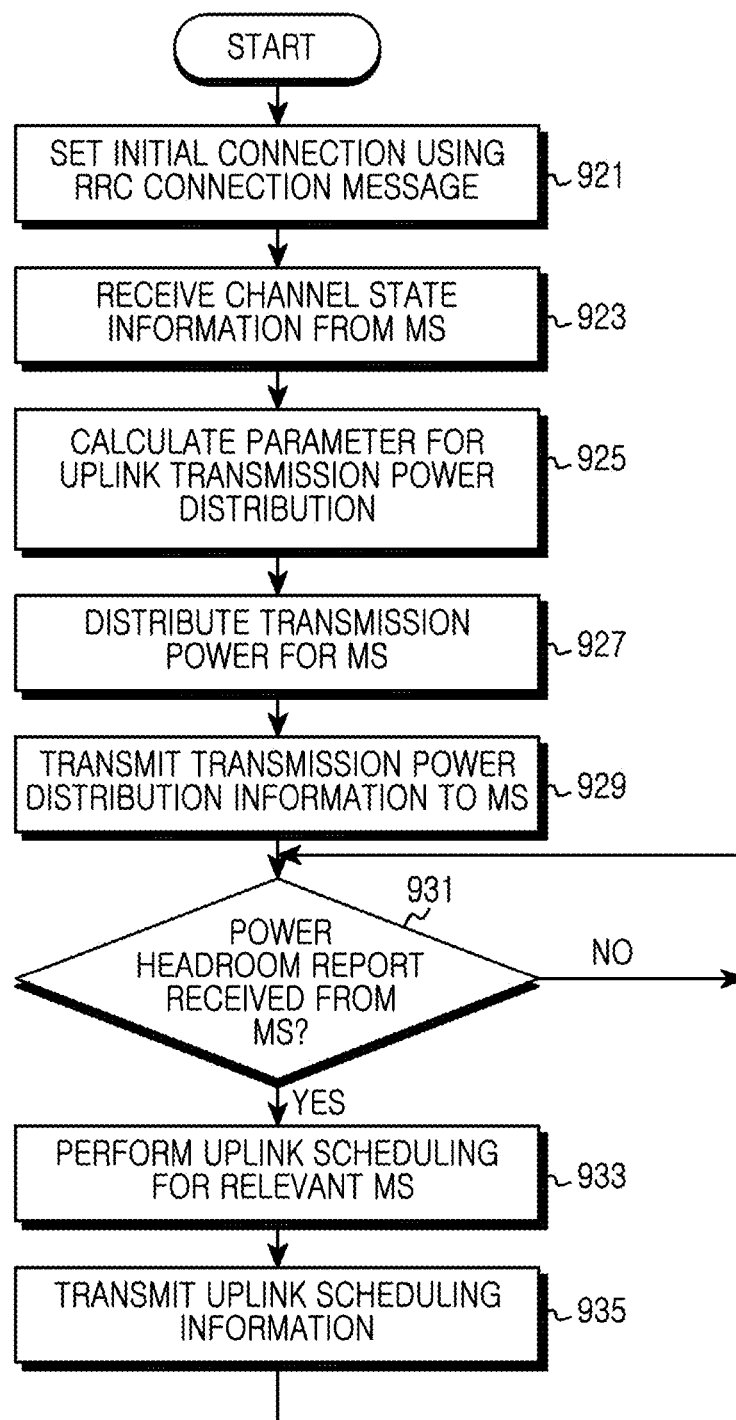
FIG. 9B is a flowchart illustrating an operation procedure where a BS distributes maximum transmission power of a UE and receives a power headroom report in a wireless communication system according to an embodiment of the present disclosure.
Figure 10:
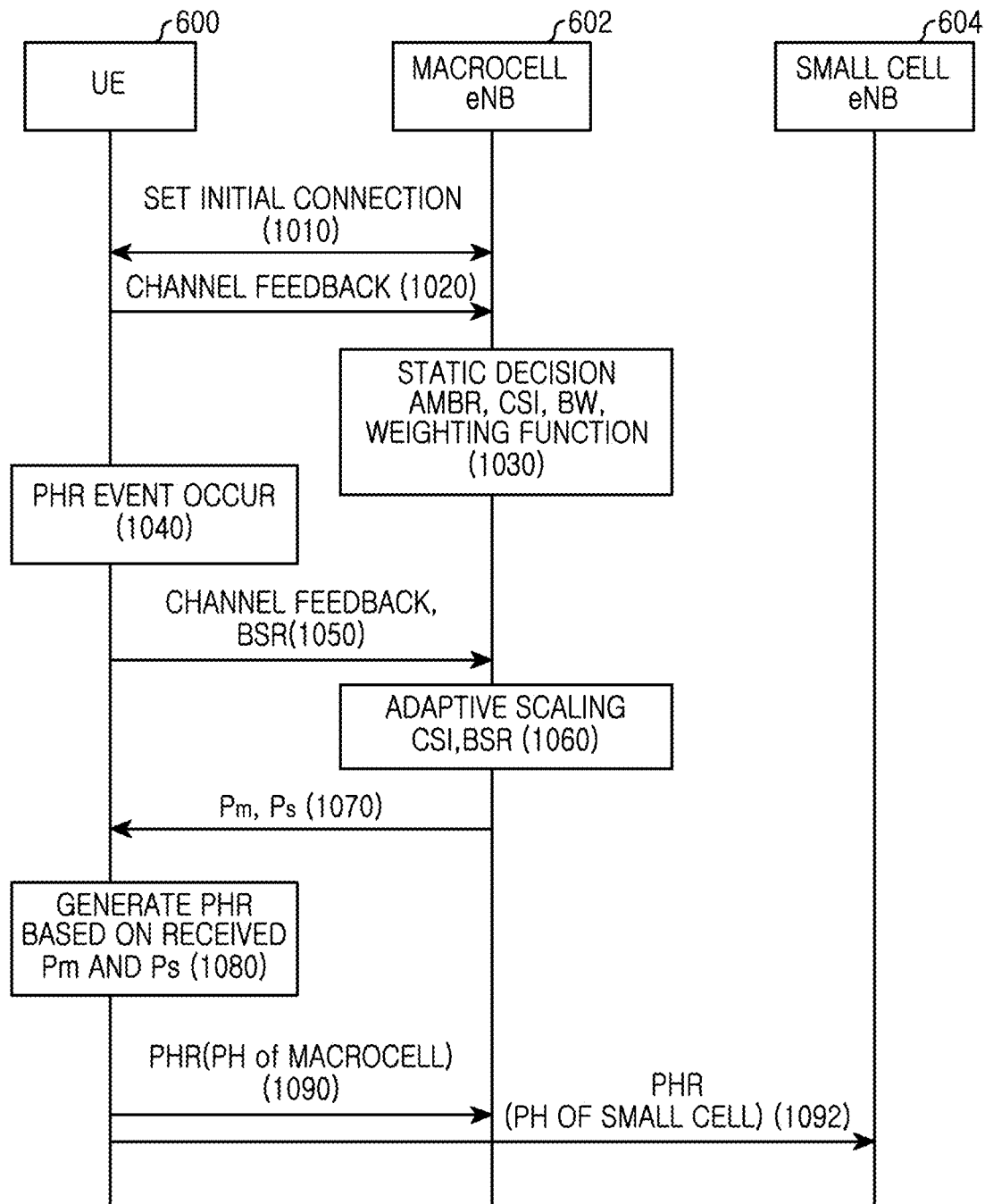
FIG. 10 is a view illustrating an operation procedure where a BS distributes and adjusts maximum transmission power of a UE, and the UE performs a power headroom report on a plurality of BSs to which the UE is being wirelessly connected based on this in a wireless communication system according to an embodiment of the present disclosure.
Figure 11:
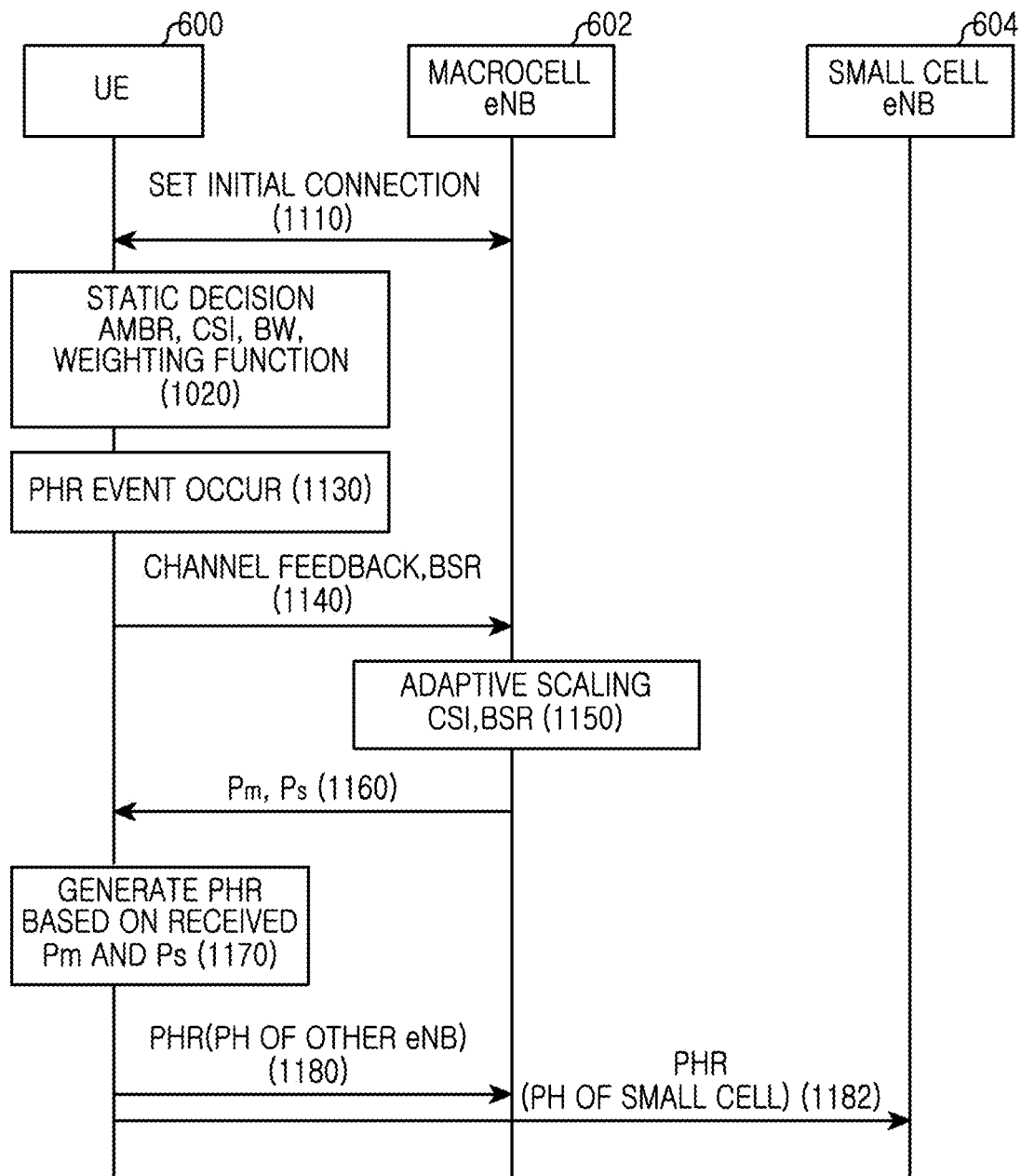
FIG. 11 is a view illustrating an operation procedure where a BS distributes and adjusts maximum transmission power of a UE, and the UE performs a power headroom report on a plurality of BSs to which the UE is being wirelessly connected based on this in a wireless communication system according to an embodiment of the present disclosure.

For example, as illustrated in FIGS. 8 to 9B, the macro BS performs the static decision operation, and an MS may perform the adaptive scaling operation. For another example, as illustrated in FIG. 10, the macro BS may perform both the static decision operation and the adaptive scaling operation. For still another example, as illustrated in FIG. 11, the UE may perform the static decision operation, and the macro BS may perform the adaptive scaling operation.

FIG. 8 is a view illustrating a signal flow where a BS distributes maximum transmission power of a UE and the UE performs a power headroom report on a plurality of BSs to which the UE is being wirelessly connected in a wireless communication system according to an embodiment of the present disclosure.

Referring to FIG. 8, the UE 600 and the macro BS 602 perform initial connection setting in operation 810. At this point, the macro BS 602 may transmit an RRC message including PHR related control information illustrated in Table 2 to the UE 600. After that, the UE 600 estimates a channel for each of the macro BS 602 and the small BS 604, and feeds back a channel estimated result to the macro BS 602 in operation 820. For example, the channel estimated result may include an AMBR and channel state information for each of the macro BS 602 and the small BS 604.

The macro BS 602 that has received the channel estimated result from the UE 600 performs a static decision operation that distributes maximum transmission power of the UE 600 to the macro BS 602 and the small BS 604 in operation 830. At this point, as illustrated in FIG. 5A, the macro BS 602 may divide the maximum transmission power of the UE 600 to transmission power for the macro BS 602 and transmission power for the small BS 604 based on at least one of an AMBR, channel state information, a bandwidth, and a weight parameter.

After that, the macro BS 602 transmits transmission power distribution information for each BS to the UE 600 using an RRC reconfiguration message in operation 840. At this point, the transmission power distribution information may be expressed as a ratio of transmission power distributed to the macro BS 602 and transmission power distributed to the small BS 604. For example, the macro BS 602 may transmit the RRC reconfiguration message including PHR related control information illustrated in Table 3 below to the UE 600.

TABLE 3

| PHR-Config | |
|---|---|
| setup | |
| periodic PHR-Timer | Timer_1 |
| prohibitPHR-Time | Time_1 |
| dl-PathlossChange | Threshold_1 |
| Pm_vs_Ps_ratio | calculated_value |

Here, PHR-Config means a field including control information related to a PHR in an RRC message, periodic PHR-Timer means a periodic timer that controls a power headroom report to be triggered periodically, and prohibit PHR-Time means a time section that controls a power headroom report not to be controlled. At this point, prohibit PHR-Time may be set to a measurement time of the prohibit timer. Also, dl-PathlossChange means a threshold for a path loss, $P_m\_vs\_P_s\_$ratio means a ratio of transmission power distributed to the macro BS 602 and transmission power distributed to the small BS 604.

After that, the UE 600 detects occurrence of a power headroom report trigger event in operation 850. That is, the UE 600 may detect occurrence of a power headroom report trigger event based on PHR related control information included in an RRC message illustrated in Table 2. Here, since an operation where the UE 600 detects occurrence of a power headroom report trigger event is the same as operation 630, a detailed description thereof is omitted.

The UE 600 that has detected occurrence of a power headroom report trigger event performs an adaptive scaling operation of adjusts transmission power initially distributed to the macro BS 602 and the small BS 604 in operation 860. At this point, the UE 600 may control whole maximum transmission power $P_{max}$ of the UE to be allocated ($P_s=P_{max}$) to only the small BS 604 or may control whole maximum transmission power $P_{max}$ of the UE to be allocated ($P_m=P_{max}$) to only the macro BS 602 based on a channel state of each BS and a data amount of an uplink buffer. Also, the UE 600 may adjust a ratio of maximum transmission power distributed to the macro BS 602 and the small BS 604.

The UE 600 generates a transmission power headroom report message for the macro BS 602 and the small BS 604 based on the transmission power of the macro BS 602 and the small BS 604 adjusted by the adaptive scaling operation in operation 870. The UE 600 transmits a relevant power headroom report message to the macro BS 602 and the small BS 604 in operations 890 and 892.

Here, for convenience, a description has been made of only initial connection setting between the UE 600 and the macro BS 602 in operation 810. However, it is natural that initial connection setting between the UE 600 and the small BS 604 should be performed before operation 820 (before the UE 600 estimates a channel for a plurality of BSs) in order to apply the embodiment of the present disclosure.

FIG. 9A is a flowchart illustrating an operation procedure where a UE performs a power headroom report on a plurality of BSs to which the UE is being wirelessly connected based on maximum transmission power distribution information received from a BS in a wireless communication system according to an embodiment of the present disclosure.

Referring to FIG. 9A, the UE 600 performs initial connection setting with the macro BS 602 using an RRC message in operation 901. At this point, the UE 600 may receive an RRC message including PHR related control information illustrated in Table 2 from the macro BS 602. Here, for convenience in description, it is assumed that the UE 600 has set connection with the small cell 602 in advance.

When the initial connection setting is completed, the UE 600 estimates a channel for the macro BS 602 and the small BS 604 in operation 903, and feeds back the estimated results. Here, the UE 600 may calculate at least one parameter required for distributing uplink maximum transmission power of the UE via channel estimation, and feed back the channel estimated result including the calculated at least one parameter to the macro BS 602.

In operation 905, the UE 600 determines whether transmission power distribution information is received via an RRC reconfiguration message illustrated in Table 3. In the case where the transmission power distribution information is received via the RRC reconfiguration message, the UE 600 distributes maximum transmission power of the UE 600 to the macro BS 602 and the small BS 604 based on the transmission power distribution information in operation 907. For example, in the case where maximum transmission power of the UE 600 is 200 mW and the transmission power distribution information is "Pm:Ps=1:4", the UE 600 may allocate transmission power of 40 mW to the macro BS 600 and allocate transmission power of 160 mW to the small BS 604.

After that, the UE 600 detects whether an event for triggering a power headroom report occurs in operation 909. For example, the UE 600 may detect occurrence of a power headroom report trigger event based on PHR related control information included in an RRC message illustrated in Table 2. For another example, the UE 600 may detect at least one of a path loss change, an MPR, Scell activation, and power back off via a MAC entity corresponding to at least one BS among two BSs connected via a wireless link to detect occurrence of an event for triggering a power headroom report. For another example, the UE 600 may detect occurrence of an event for triggering a power headroom report by periodic power headroom report or reconfiguration for each BS via a MAC entity corresponding to each of two BSs. For a more specific example, the UE 600 may detect occurrence of a periodic power headroom report trigger event based on at least one of a periodic PHR-Timer parameter and a prohibit PHR-Time parameter included in an RRC message. For still another example, the UE 600 may periodically measure a path loss for each of a plurality of BSs that are being connected to calculate a path loss change amount, and in the case where the calculated path loss change amount is greater than dl-PathlossChange parameter included in the RRC message, the UE 600 may detect occurrence of a power headroom report trigger event.

The UE 600 that has detected occurrence of a power headroom report trigger event adjusts transmission power for each BS based on an uplink buffer data amount of each of the plurality of BSs that are being connected in operation 911. At this point, the UE 600 may periodically monitor an uplink buffer data amount for a plurality of BSs that are being connected, and in the case where an uplink buffer data amount for at least one BS becomes smaller than Buffer_Threshold included in an RRC message, or a state where an uplink buffer data amount for at least one BS that is being connected is smaller than Buffer_Threshold included in an RRC message is maintained for a time of Buffer-Timer included the RRC message, the UE 600 adjusts a ratio of transmission power initially distributed to each BS via a static decision operation. For another example, in the case where an uplink buffer data amount for a plurality of BSs that are being connected is greater than Buffer_Threshold included in the RRC message but a channel state change amount for at least one BS is equal to or greater than a threshold set in advance, the UE 600 may adjust a ratio of transmission power initially distributed to each BS via a static decision operation. Specifically, the UE 600 may control whole maximum transmission power $P_{max}$ of the UE to be allocated ($P_s=P_{max}$) to only the small BS 604 or may control whole maximum transmission power $P_{max}$ of the UE to be allocated ($P_m=P_{max}$) to only the macro BS 602 based on a channel state of each BS and a data amount of an uplink buffer. Also, the UE 600 may adjust a ratio of maximum transmission power distributed to the macro BS 602 and the small BS 604. Here, a method for adjusting transmission power may be the same as that described in FIG. 7C.

In operation 913, the UE 600 generates a transmission power headroom report message for each of the macro BS 602 and the small BS 604 based on transmission power adjusted for each of the macro BS 602 and the small BS 604, and transmits the generated power headroom report messages to the macro BS 602 and the small BS 604, respectively. After that, the UE 600 returns to operation 909 to re-perform subsequent operations.

FIG. 9B is a flowchart illustrating an operation procedure where a BS distributes maximum transmission power of a UE and receives power headroom report in a wireless communication system according to an embodiment of the present disclosure.

Referring to FIG. 9B, the macro BS 602 performs initial connection with the UE 600 using an RRC message in operation 921. At this point, the RRC message may include PHR related control information illustrated in Table 2.

After that, the macro BS 602 may receive a channel estimated result from UE in operation 923. At this point, the channel estimated result may include at least one parameter required for distributing uplink maximum transmission power of the UE. The macro BS 602 may calculate an additional parameter required for distributing uplink maximum transmission power of the UE in operation 925. For example, the macro BS 602 may receive an AMBR and channel state information for each BS from the UE 600, and directly calculate a bandwidth and/or weight for each BS. At this point, the macro BS 602 may calculate a bandwidth and/or weight for the small BS 604 based on a channel estimated result received from the UE 600, and calculate a bandwidth and weight via advance information exchange with the small BS 604.

In operation 927, the macro BS 602 distributes maximum transmission power of the UE to a plurality of BSs to which the relevant US is being connected, that is, the macron BS 602 and the small BS 604 based on the calculated parameter. Here, a method for distributing the maximum transmission power may be the same as the static decision method.

After that, the macro BS 602 transmits transmission power distribution information to the UE in operation 929. At this point, the macro BS 602 may incorporate the transmission power distribution information into an RRC message illustrated in Table 3 and transmit the same.

After that, the macro BS 602 determines whether a power headroom report message is received from the UE in operation 931. When receiving a power headroom report message, the macro BS 602 performs uplink scheduling for the relevant UE in operation 933. For example, the macro BS 602 may estimate uplink maximum transmission power supportable by the UE based on power headroom information of the UE, and perform uplink control such as TPC, an MCS level, a bandwidth, etc. within a range that does not depart from the estimated uplink maximum transmission power.

After that, the macro BS 602 transmits uplink scheduling information to the UE 600 in operation 935, and returns to operation 931 to re-perform subsequent operations.

FIG. 10 is a view illustrating an operation procedure where a BS distributes and adjusts maximum transmission power of a UE, and the UE performs a power headroom report on a plurality of BSs to which the UE is being wirelessly connected based on this in a wireless communication system according to an embodiment of the present disclosure.

Referring to FIG. 10, the UE 600 and the macro BS 602 perform initial connection setting in operation 1010. At this point, the macro BS 602 may transmit an RRC message including PHR related control information illustrated in Table 2 to the UE 600. After that, the UE 600 estimates a channel for each of the macro BS 602 and the small BS 604, and feeds back a channel estimated result to the macro BS 602 in operation 1020. For example, the channel estimated result may include an AMBR and channel state information for each of the macro BS 602 and the small BS 604.

The macro BS 602 that has received the channel estimated result from the UE 600 performs a static decision operation that distributes maximum transmission power of the UE 600 to the macro BS 602 and the small BS 604 in operation 1030. At this point, as illustrated in FIG. 5A, the macro BS 602 may divide the maximum transmission power of the UE 600 to transmission power for the macro BS 602 and transmission power for the small BS 604 based on at least one of an AMBR, channel state information, a bandwidth, and a weight parameter.

Meanwhile, the UE 600 detects occurrence of a power headroom report trigger event in operation 1040. That is, the UE 600 may detect occurrence of a power headroom report trigger event based on PHR related control information included in an RRC message illustrated in Table 2. Here, since an operation of detecting occurrence of a power headroom report trigger event is the same as operation 630, a detailed description thereof is omitted.

The UE 600 that has detected occurrence of a power headroom report trigger event performs channel estimation for each of the macro BS 602 and the small BS 604 to transmit the channel estimated results to the macro BS 602, and transmits a buffer state report message representing a data amount of an uplink buffer for each of the macro BS 602 and the small BS 604 to the macro BS 602 in operation 1050.

After that, the macro BS 602 performs an adaptive scaling operation that adjusts an initially distributed transmission power amount in operation 1060. At this point, the macro BS 602 may control whole maximum transmission power $P_{max}$ of the UE to be allocated ($P_s=P_{max}$) to only the small BS 604 or may control whole maximum transmission power $P_{max}$ of the UE to be allocated ($P_m=P_{max}$) to only the macro BS 602 based on the channel estimated results and a buffer state report message received from the UE 600. Also, the macro BS 602 may adjust a ratio of maximum transmission power distributed to the macro BS 602 and the small BS 604 based on the channel estimated results and a buffer state report message received from the UE 600.

In operation 1070, the macro BS 602 transmits information regarding transmission power of each of the macro BS 602 and the small BS 604 adjusted by the adaptive scaling operation to the UE 600. At this point, the information regarding transmission power of each of the macro BS 602 and the small BS 604 may be transmitted via an RRC message.

In operation 1080, the UE 600 generates a transmission power headroom report message for the macro BS 602 and the small BS 604 based on the received transmission power information of each of the macro BS 602 and the small BS 604. The UE 600 transmits relevant power headroom report messages to the macro BS 602 and the small BS 604, respectively, in operations 1090 and 1092.

Here, for convenience, a description has been made of only initial connection setting between the UE 600 and the macro BS 602 in operation 1010. However, it is natural that initial connection setting between the UE 600 and the small BS 604 should be performed before operation 1020 (before a static decision operation is performed) in order to apply the embodiment of the present disclosure.

FIG. 11 is a view illustrating an operation procedure where a BS distributes and adjusts maximum transmission power of a UE, and the UE performs a power headroom report on a plurality of BSs to which the UE is being wirelessly connected based on this in a wireless communication system according to an embodiment of the present disclosure.

Referring to FIG. 11, the UE 600 and the macro BS 602 perform initial connection setting in operation 1110. At this point, the macro BS 602 may transmit an RRC message including PHR related control information illustrated in Table 2 to the UE 600.

When initial connection setting is completed, the UE 600 performs a static decision operation that distributes maximum transmission power of the UE 600 to a macro BS 602 and a small BS 604 that are being connected in operation 1120. At this point, as illustrated in FIG. 5A, the UE 600 may distribute maximum transmission power to transmission power of the macro BS 602 and transmission power of the small BS 604 based on at least one of an AMBR, channel state information, a bandwidth, and a weight parameter. Depending on an embodiment, the UE 600 may distribute maximum transmission power using a parameter indicated by the macro BS 602 among the AMBR, the channel state information, the bandwidth, and the weight parameter. For example, the macro BS 602 may add a parameter to be used for maximum transmission power distribution to an RRC message illustrated in Table 2, and transmit the same to the UE 600.

After that, the UE 600 detects occurrence of a power headroom report trigger event in operation 1130. For example, the UE 600 may detect occurrence of a power headroom report trigger event based on PHR related control information included in an RRC message illustrated in Table 2. Here, since an operation where the UE 600 detects occurrence of a power headroom report trigger event is the same as operation 630, a detailed description thereof is omitted.

The UE 600 that has detected occurrence of a power headroom report trigger event performs channel estimation for each of the macro BS 602 and the small BS 604 to transmit the channel estimated results to the macro BS 602, and transmits a buffer state report message representing a data amount of an uplink buffer for each of the macro BS 602 and the small BS 604 to the macro BS 602. Additionally, the UE 600 may transmit transmission power distribution information for the macro BS 602 and the small BS 604 to the macro BS 602 in operation 1140.

After that, the macro BS 602 performs an adaptive scaling operation that adjusts an initially distributed transmission power amount in operation 1150. At this point, the macro BS 602 may control whole maximum transmission power $P_{max}$ of the UE to be allocated ($P_s=P_{max}$) to only the small BS 604 or may control whole maximum transmission power $P_{max}$ of the UE to be allocated ($P_m=P_{max}$) to only the macro BS 602 based on the channel estimated results and a buffer state report message received from the UE 600. Also, the macro BS 602 may adjust a ratio of maximum transmission power distributed to the macro BS 602 and the small BS 604 based on the channel estimated results and a buffer state report message received from the UE 600.

In operation 1160, the macro BS 602 transmits information for transmission power of each of the macro BS 602 and the small BS 604 adjusted by the adaptive scaling operation to the UE 600. At this point, the information for transmission power of each of the macro BS 602 and the small BS 604 may be transmitted via an RRC message.

In operation 1170, the UE 600 generates a transmission power headroom report message for the macro BS 602 and the small BS 604 based on received transmission power information of the macro BS 602 and the small BS 604. The UE 600 transmits a relevant power headroom report message to each of the macro BS 602 and the small BS 604 in operations 1180 and 1182.

Here, for convenience, a description has been made of initial connection setting between the UE 600 and the macro BS 602 in operation 1110. However, it is natural that initial connection setting between the UE 600 and the small BS 604 should be performed before operation 1120 (before a static decision operation is performed) in order to apply the embodiment of the present disclosure.

Additionally, in the embodiments of FIGS. 6 to 11, the transmission power headroom report message may be generated to include both transmission power information of a macro BS and transmission power information of a small BS, and may be generated to include only transmission power information of one of the macro BS 602 and the small BS 604. Also, the UE may transmit a transmission power headroom report message including information for transmission power of the macro BS to the macro BS, and transmit a transmission power headroom report message including information for transmission power of the small BS to the small BS. Likewise, the UE may transmit a transmission power headroom report message including information for transmission power of the small BS to the small BS, and transmit a transmission power headroom report message including information for transmission power of the macro BS to the small BS.

Figure 12:
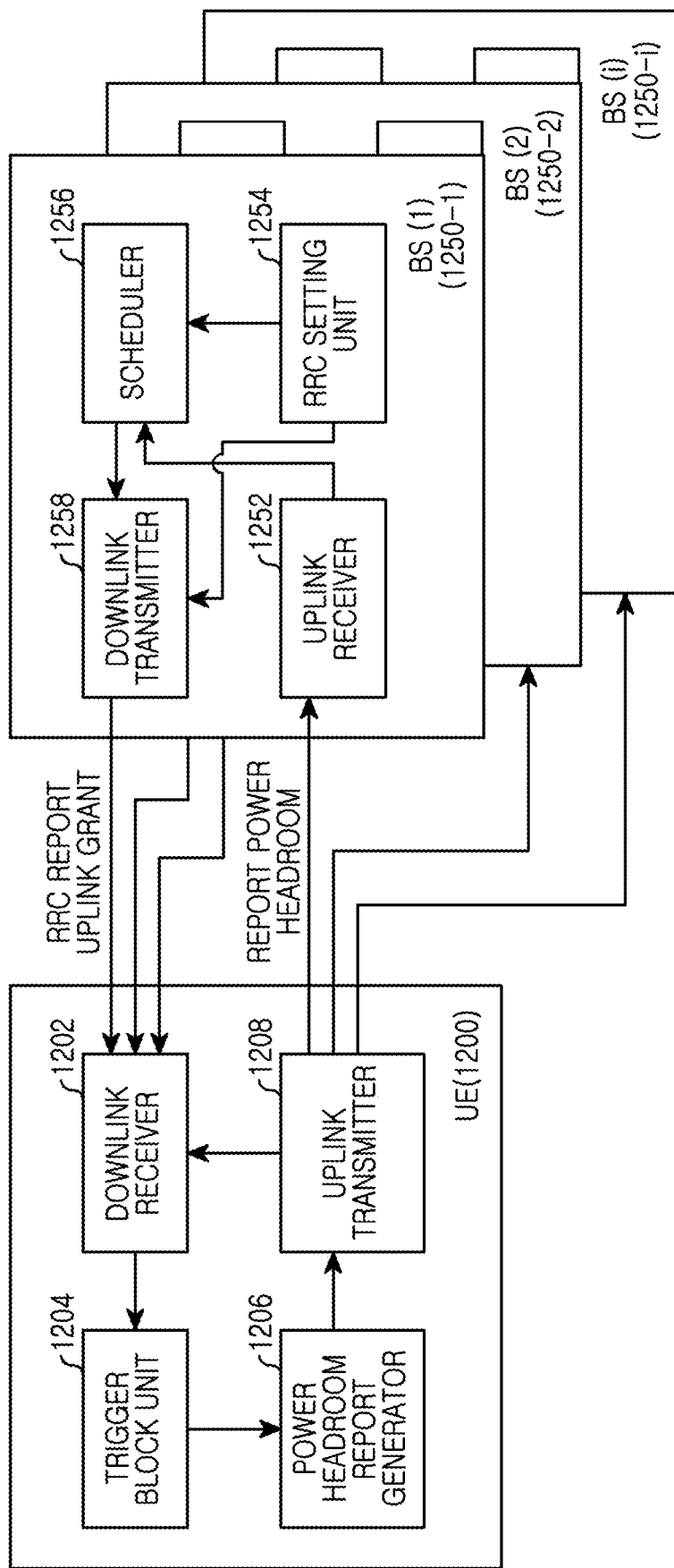
FIG. 12 is a block diagram illustrating a UE and a BS forming a wireless communication system according to an embodiment of the present disclosure.

FIG. 12 is a block diagram illustrating a UE and a BS forming a wireless communication system according to an embodiment of the present disclosure.

As illustrated in FIG. 12, the UE 1200 is connected to a plurality of BSs 1250-1, 1250-2 to 1250-i.

Particularly, the UE 1200 may include a downlink receiver 1202, a trigger prohibit unit 1204, a power headroom report generator 1206, and an uplink transmitter 1208. Each of the BSs 1250-1 to 1250-i may include an uplink receiver 1252, an RRC generator 1254, a scheduler 1256, and a downlink transmitter 1258.

First, construction of the UE 1200 is described. The downlink receiver 1202 of the UE forms a wireless connection link with the plurality of BSs 1250-1 to 1250-i. The downlink receiver 1202 may receive an uplink grant representing uplink scheduling information from the plurality of BSs 1250-1 to 1250-i, and receive an RRC message from the plurality of BSs 1250-1 to 1250-i. Particularly, the downlink receiver 1202 may receive an RRC message illustrated in Table 1, Table 2, or Table 3 from at least one BS.

The trigger prohibit unit 1204 blocks triggering of a power headroom report of the UE 1200. That is, the trigger prohibit unit 1204 may set a prohibit timer using prohibitPHR-Time included in an RRC message, and control a power headroom report not to be triggered while the prohibit timer operates. When the blocking timer expires, the trigger blocking unit 1204 detects an opportunity that may trigger a power headroom report is generated, and detects whether a power headroom report trigger event occurs. For example, the trigger prohibit unit 1204 may extract PHR related control parameters from an RRC message, and detect whether an event for triggering a power headroom report occurs based on the extracted parameters. For another example, the trigger prohibit unit 1204 may detect at least one of a path loss change, an MPR, Scell activation, and power back off via a MAC entity corresponding to at least one BS among a plurality of BSs whose wireless link with the UE 1200 has been formed to detect an event for triggering a power headroom report. For another example, the trigger prohibit unit 1204 may detect occurrence of an event for triggering a power headroom report by periodic power headroom report or reconfiguration for each BS via a MAC entity corresponding to a plurality of BSs.

When occurrence of an event for triggering a power headroom report is detected by the trigger prohibit unit 1204, the power headroom report generator 1206 may generate a power headroom report message. When a power headroom is changed by a threshold or more by uplink scheduling of a specific BS among a plurality of BSs to which the UE 1200 is being connected, the power headroom report generator 1206 controls a function for generating a power headroom report message representing the changed power headroom to transmit the same to at least one different BS. Also, the power headroom report generator 1206 may perform a static decision operation that distributes maximum transmission power of the UE 1200 to each of the plurality of BSs that are being connected, and perform an adaptive scaling operation of adjusting transmission power distributed to each of the plurality of BSs. Here, the static decision operation and the adaptive scaling operation may be performed as illustrated in FIGS. 5A to 11. The power headroom report generator 1206 may generate a power headroom report message for each of the plurality of BSs based on transmission power of each of the plurality of BSs adjusted by the adaptive scaling operation.

The uplink transmitter 1208 forms a wireless link with the plurality of BSs 1250-1 to 1250-i. The uplink transmitter 1208 may report a channel estimated result of each of the plurality of BSs 1250-1 to 1250-i to a specific BS, and transmit a power headroom report message to each of the plurality of BSs 1250-1 to 1250-i. Additionally, the uplink transmitter 1208 may transmit a buffer state report message representing a data amount of an uplink buffer for the plurality of BSs 1250-1 to 1250-i to a specific BS.

Next, the construction of each of the plurality of BSs 1250-1 to 1250-i is described. First, the uplink receiver 1252 forms a wireless connection link with the UE 1200. The uplink receiver 1252 may receive a channel estimated result for each of the plurality of BSs 1250-1 to 1250-i from the UE 1200, and receive a power headroom report message for the BS itself. Additionally, the uplink receiver 1252 may receive a buffer state report message representing a data amount of an uplink buffer for each of the plurality of BSs 1250-1 to 1250-i from the UE 1200.

The RRC generator 1254 generates an RRC message for connection with the UE 1200. Particularly, according to the present disclosure, the RRC generator 1254 may generate an RRC message illustrated in Table 1, Table 2, or Table 3.

The scheduler 1256 performs scheduling for the UE based on a power headroom report message. Also, the scheduler 1256 may perform a static decision operation that distributes maximum transmission power of the UE 1200 to each of the plurality of BSs to which the relevant UE 1200 is being connected, and perform an adaptive scaling operation of adjusting transmission power distributed to each of the plurality of BSs. Here, the static decision operation and the adaptive scaling operation may be performed as illustrated in FIGS. 5A to 11.

The downlink transmitter 1258 forms a wireless connection link with the UE 1200. The downlink transmitter 1258 may transmit an uplink grant representing a scheduling result of the scheduler 1256 for the relevant UE 1200, and transmit an RRC message generated by the RRC generator 1254.

Though the downlink receiver and the uplink transmitter of each of the UE and the BS have been described separately, this is exemplary for convenience in description, and the downlink receiver and the uplink transmitter may be configured as one transceiver. Also, the trigger prohibit unit 1204 and the power headroom report generator 1206 of the UE may be configured in one module (for example, a power headroom report controller). Also, the RRC setting unit 1254 and the scheduler 1256 of the BS may be configured as one module.

An embodiment of the present disclosure relates to uplink power headroom report of the UE in a wireless communication system where one UE supports transmission links for a plurality of BSs, simultaneously. Since a separate delay does not occur in connection with transmission of power headroom report, performance deterioration due to this may be prevented, and uplink transmission power of the UE may be efficiently distributed and used based on a channel state and an uplink data amount for each of the plurality of BSs.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by a user equipment (UE) in a wireless communication system, the method comprising:
   receiving a radio resource control (RRC) message from a first base station (BS), the RRC message including information on a first power threshold for the first BS, wherein the UE is configured in a dual connectivity with the first BS and a second BS; and
   based on identifying that uplink resources are allocated for a cell associated with the first BS and a change of a power parameter for the cell is greater than the first power threshold for the first BS, transmitting a power headroom (PH) report (PHR) to the second BS, wherein the PHR is transmitted via a media access control (MAC) control element (CE), and
wherein the PHR includes PH associated with the cell associated with the first BS.

2. The method of claim 1,
wherein a periodic timer for the first BS starts or restarts in case of a transmission of the PHR to the second BS,
wherein the RRC message further includes a value of the periodic timer for the first BS, and
wherein the value of the periodic timer for the first BS is indicated by a number of subframes.

3. The method of claim 1, wherein the power parameter comprises a power backoff.

4. The method of claim 1, wherein the change of the power parameter is obtained from PH of the cell before the uplink resources are allocated.

5. A user equipment (UE) in a wireless communication system, the UE comprising:
at least one transceiver; and
at least one processor coupled to the at least one transceiver and configured to:
receive a radio resource control (RRC) message from a first base station (BS), the RRC message including information on a first power threshold for the first BS, wherein the UE is configured in a dual connectivity with the first BS and a second BS, and
based on identifying that uplink resources are allocated for a cell associated with the first BS and a change of a power parameter for the cell is greater than the first power threshold for the first BS, transmit a power headroom (PH) report (PHR) to the second BS,
wherein the PHR is transmitted via a media access control (MAC) control element (CE), and
wherein the PHR includes PH associated with the cell associated with the first BS.

6. The UE of claim 5,
wherein a periodic timer for the first BS starts or restarts in case of a transmission of the PHR to the second BS,
wherein the RRC message further includes a value of the periodic timer for the first BS, and
wherein the value of the periodic timer for the first BS is indicated by a number of subframes.

7. The UE of claim 5, wherein the power parameter comprises a power backoff.

8. The UE of claim 5, wherein the change of the power parameter is obtained from PH of the cell before the uplink resources are allocated.

9. A method performed by a first base station (BS), the method comprising:
transmitting, to a user equipment (UE), a radio resource control (RRC) message, the RRC message including information on a first power threshold for the first BS, wherein the UE is configured in a dual connectivity with the first BS and a second BS; and
allocating uplink resources for a cell associated with the first BS to the UE,
wherein the uplink resources and a change of a power parameter for the cell being greater than the first power threshold for the first BS are used to trigger to a power headroom (PH) report (PHR) to the second BS via a media access control (MAC) control element (CE), and
wherein the PHR includes PH associated with the cell associated with the first BS.

10. The method of claim 9,
wherein a periodic timer for the first BS starts or restarts in case of a transmission of the PHR to the second BS from the UE,
wherein the RRC message further includes a value of the periodic timer for the first BS, and
wherein the value of the periodic timer for the first BS is indicated by a number of subframes.

11. The method of claim 9, wherein the power parameter comprises a power backoff.

12. The method of claim 9, wherein the change of the power parameter is obtained from PH of the cell before the uplink resources are allocated.

13. A first base station (BS), comprising:
at least one transceiver; and
at least one processor coupled to the at least one transceiver and configured to:
transmit, to a user equipment (UE), a radio resource control (RRC) message including information on a first power threshold for the first BS, wherein the UE is configured in a dual connectivity with the first BS and a second BS, and
allocate uplink resources for a cell associated with the first BS to the UE,
wherein the uplink resources and a change of a power parameter for the cell being greater than the first power threshold for the first BS are used to trigger to a PHR power headroom (PH) report (PHR) to the second BS via a media access control (MAC) control element (CE), and
wherein the PHR includes PH associated with the cell associated with the first BS.

14. The first BS of claim 13,
wherein a periodic timer for the first BS starts or restarts in case of a transmission of the PHR to the second BS from the UE,
wherein the RRC message further includes a value of the periodic timer for the first BS, and
wherein the value of the periodic timer for the first BS is indicated by a number of subframes.

15. The first BS of claim 13, wherein the power parameter comprises a power backoff.

16. The first BS of claim 13, wherein the change of the power parameter is obtained from PH of the cell before the uplink resources are allocated.

* * * * *